United States Patent [19]

Leistner et al.

[11] Patent Number: 4,529,760
[45] Date of Patent: Jul. 16, 1985

[54] OLIGOMERS OF 2,2,6,6-TETRAMETHYLPIPERIDINOL POLYCARBOXYLIC ACID ESTERS AND SYNTHETIC POLYMER COMPOSITIONS

[75] Inventors: William E. Leistner, Atlantic Beach, N.Y.; Motonobu Minagawa, Koshigaya, Japan; Yutaka Nakahara, Iwatsuki, Japan; Tohru Haruna, Okegawa, Japan; Atsushi Nishimura, Washinomiya, Japan

[73] Assignee: Adeka Argus Chemical Co., Ltd., Urawa, Japan

[21] Appl. No.: 547,814

[22] Filed: Nov. 1, 1983

[30] Foreign Application Priority Data

Nov. 1, 1982 [JP] Japan .................. 57-192086

[51] Int. Cl.$^3$ .................................................. C08K 5/31
[52] U.S. Cl. .................................. 524/102; 524/103; 524/291; 524/326; 524/334; 524/335; 524/339; 524/341; 524/342; 524/349; 528/289; 546/19; 546/187; 546/188; 546/190; 546/207; 546/242
[58] Field of Search ............... 524/102, 103, 291, 326, 524/334, 335, 339, 341, 342, 349; 528/289; 546/19, 187, 188, 190, 207, 242

[56] References Cited

U.S. PATENT DOCUMENTS

| | | | |
|---|---|---|---|
| 4,233,412 | 11/1980 | Rody et al. ..................... | 528/289 |
| 4,312,804 | 1/1982 | Minagawa et al. .............. | 524/102 |
| 4,336,183 | 6/1982 | Nakahara et al. ............... | 524/103 |
| 4,396,735 | 8/1983 | Minagawa et al. .............. | 524/102 |

*Primary Examiner*—John Kight
*Assistant Examiner*—Kriellion Morgan

[57] ABSTRACT

Oligomers of 2,2,6,6-tetramethylpiperidinol polycarboxylic acid esters are provided having the formula:

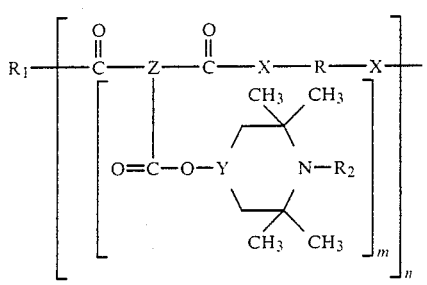

-continued

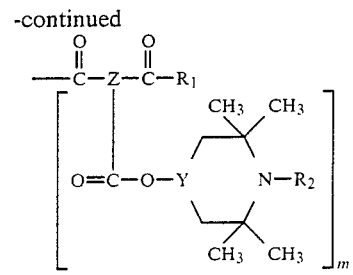

wherein:

Z is the residue of an aliphatic or aromatic or nitriloaliphatic or hydroxy aliphatic polycarboxylic acid having from three to six carboxylic acid groups and from one to thirty carbon atoms;

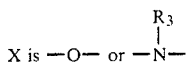

wherein $R_3$ is hydrogen, alkyl and hydroxyalkyl having from one to about twenty carbon atoms; cycloalkyl having from six to about twenty carbon atoms; aryl having from six to about twenty carbon atoms; or cycloalkylene with the N in the ring and having from two to five carbon atoms;

R is alkylene having from two to about twelve carbon atoms; cycloalkylene having from three to about twelve carbon atoms; phenylene having from six to about twenty carbon atoms; mixed alkylenecycloalkylene or alkylene phenylene or oxyalkylene having from two to about twelve carbon atoms;

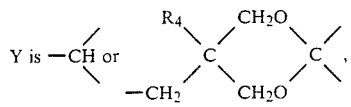

wherein $R_4$ is alkyl having from one to about six carbon atoms;
$R_2$ is hydrogen; oxyl; alkyl having from one to about twenty carbon atoms; epoxyalkyl having from two to about six carbon atoms or hydroxyalkyl having from one to about six carbon atoms; acyl having from one to about six carbon atoms; aroyl having from seven to about twenty carbon atoms; and alkaryl having from seven to about twenty carbon atoms;

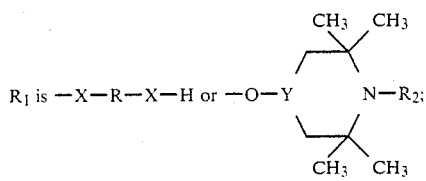

m is a number from 1 to 4; and
n is a number from 1 to 10.

44 Claims, No Drawings

OLIGOMERS OF 2,2,6,6-TETRAMETHYLPIPERIDINOL POLYCARBOXYLIC ACID ESTERS AND SYNTHETIC POLYMER COMPOSITIONS

Synthetic polymers such as polyethylene, polypropylene, ABS resin, polyvinyl chloride and polyurethanes are subject to degradation and discloration upon exposure to ultraviolet light, with significant deterioration in mechanical strength.

Various kinds of light stabilizers have accordingly been proposed, to inhibit such deterioration. However, the stabilizers available are not entirely satisfactory in stabilizing effect. Many of them are unstable to heat and oxidation, and are extracted by water or organic solvents. Some stabilizers impart color to the polymers.

Among the conventional stabilizers, 2,2,6,6-tetramethyl piperidine compounds do not impart color to the polymer, and therefore are widely used as light stabilizers.

The most important such piperidine compounds are the carboxylic acid esters of 2,2,6,6-tetramethylpiperidine-4-ol, and the ketals of trimethylolalkane with 2,2,6,6-tetramethylpiperidine-4-one. Many types of such carboxylic acid ester compounds have been disclosed as light stabilizers.

U.S. Pat. No. 3,640,928, patented Feb. 8, 1972 to Murayama et al discloses piperidine derivative stabilizers for synthetic polymers against photo- and thermodeterioration having the general formula

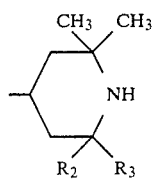

or a salt thereof.

In the above Formula I:

$R_1$ and $R_2$, which may be the same or different, each are an alkyl group such as methyl, ethyl, isopropyl or dodecyl, or they form, together with the carbon atom to which they are attached, a saturated alicyclic group such as

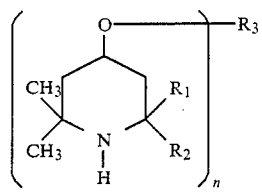

or a group of the formula

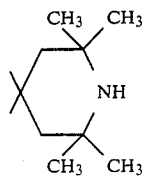

n is an integer of 1 to 3 inclusive; and $R_3$ is an acyl group derived from an aliphatic, alicyclic or heterocyclic mono di or tri carboxylic acid; a mono di or tri N-substituted carbamoyl group derived from an N-substituted carbamic acid; N-substituted thiocarbomoyl group derived from an N-substituted thiocarbamic acid; or a group obtained by removing hydroxyl groups from a mono di or tri oxoacid; an alkyl group; a cycloalkyl group; an aralkyl group; an aryl group; or a group of the general formula

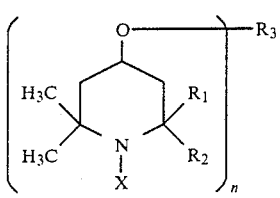

(wherein $R_1$ and $R_2$ are as defined above).

U.S. Pat. No. 3,840,494, patented Oct. 8, 1974 to Murayama et al provides acid esters of 4-piperidinol derivatives having the formula

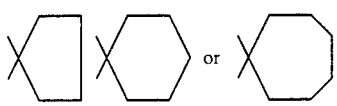

wherein $R_1$ and $R_2$ may be the same or different and represent an alkyl group of 1 to 4 carbon atoms or they may form, together with the carbon atom to which they are attached, a saturated alicyclic group or the group of the formula

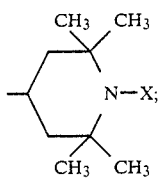

X is hydrogen atom, oxygen free radical (—O) or an alkyl group of 1 to 4 carbon atoms;

n is an integer of 1 through 4 inclusive; and

R₃ represents, when n is 1, an acyl group derived from an aliphatic or aromatic monocarboxylic acid, when n is 2, a diacyl group derived from an aliphatic or aromatic dicarboxylic acid or carbonyl group, when n is 3, a triacyl group derived from an aliphatic or aromatic tricarboxylic acid or a trivalent group obtained by eliminating three hydroxyl groups from phosphoric acid, phosphorous acid or boric acid, and when n is 4, a tetraacyl group derived from an aromatic tetracarboxylic acid or a tetravalent group obtained by eliminating four hydroxyl group from orthosilicic acid.

These are stabilizers for synthetic polymers against photo- and thermal-deterioration.

U.S. Pat. No. 4,046,737, patented Sept. 6, 1977 to Holt et al provides 1-and 4-substituted piperidine stabilizers for organic materials having the formula:

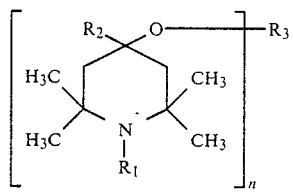

and their salts wherein n is 1, 2, 3 or 4;

$R_1$ is a monovalent residue and is an alkyl residue having from 1 to 20, preferably 1 to 12 carbon atoms, an alkenyl or alkynyl residue having from 3 to 20, preferably 3 to 12 carbon atoms, an aralkyl residue having from 7 to 12 carbon atoms, or a residue having the formula:

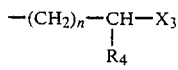

or

$R_2$ is an alkyl residue having from 1 to 4 carbon atoms, an alkenyl or alkynyl residue having 3 to 20 carbon atoms, preferably 3 to 4 carbon atoms, a cycloalkyl residue having from 5 to 12 carbon atoms, an aryl residue having from 6 to 11 carbon atoms or an aralkyl residue having from 7 to 9 carbon atoms or preferably hydrogen; and $R_3$ is a monovalent divalent or trivalent radical such as $R_1$ or a group obtained by removing hydroxyl groups from a sulphinic acid, a sulphonic acid, a phosphorus containing acid or a boric acid, or $R_3$ is an aryl residue, a cycloalkyl group having from 5 to 12 carbon atoms, or a residue having the formula:

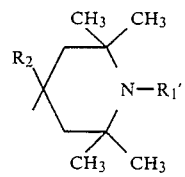

wherein $R_1'$ is hydrogen or $R_1'$ has the same significance as $R_1$.

U.S. Pat. No. 4,102,858, patented July 25, 1978 to Minagawa et al provides 2,2,6,6-tetramethyl-4-piperidyl thiocarboxylates and aminocarboxylates having the general formula:

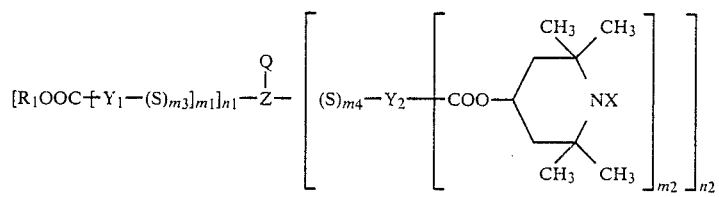

wherein:

$m_1$, $m_3$, and $m_4$ are numbers from 0 to 1;

$m_2$ is a number from 1 to 2;

$n_1$ is a number from 0 to 2;

$n_2$ is a number from 0 to 3;

$n_3$ is a number from 0 to 2;

$R_1$ is selected from the group consisting of alkyl, aralkyl, cycloalkyl and 2,2,6,6-tetramethyl-4-piperidyl;

$R_2$ selected from the group consisting of alkyl, cycloalkyl, alkylaryl, aralkyl, and hydroxy-substituted such radicals;

$R_1$ and $R_2$ have from one to about twenty carbon atoms;

X is hydrogen or O;

$Y_1$ and $Y_2$ are bivalent linking radicals having from one to about 20 carbon atoms, and selected from the group consisting of alkylene and cycloalkylene; and aminosubstituted such radicals;

Q is selected from the group consisting of $SR_2$ and

Z is an organic radical having a valence from 2 to 4 and from one to about twenty carbon atoms, and selected from the group consisting of alkylene, alkylidene, aralkylene, aralkylidene, alkarylene, alkarylidene, heterocycloalkylene, heterocycloalkylidene, cycloalkylene and cycloalkylidene; amino-substituted such radicals and 2,2,6,6-tetramethyl-4-piperidylidene; there being from one to four sulfur-containing or nitrogen-containing such groups and at least one

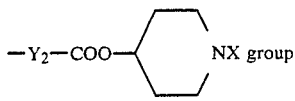

attached to the Z radical.

U.S. Pat. No. 4,105,625, patented Aug. 8, 1978 to Minagawa et al provides 2,2,6,6-tetramethyl-4-piperidyl carboxylic acid esters of aliphatic di- or tri-carboxylic acids, useful as light stabilizers for organic polymeric materials, and having the general formula:

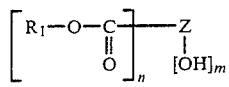

wherein:

$R_1$ is selected from the group consisting of

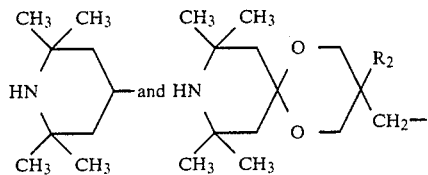

$R_2$ is $CH_3$ or $C_2H_5$;

a is selected from the group consisting of 2 and 3;

m is selected from the group consisting of 1, 2, 3 and 4; and

Z is a divalent or trivalent aliphatic radical carrying from two to three

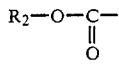

groups, and can include from one to four hydroxyl groups OH.

U.S. Pat. No. 4,116,927, patented Sept. 26, 1978 to Minagawa et al provides 2,2,6,6-tetramethyl-4-piperidyl carboxylic acid esters of butane or butene tricarboxylic acids, useful as stabilizers for organic polymeric materials, and having the general formula:

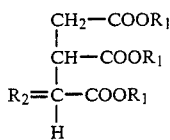

wherein:

$R_1$ is selected from the group consisting of

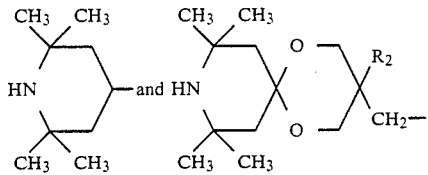

the $R_1$ groups can be the same or different;

$R_2$ is selected from the group consisting of $CH_3$ and $CH_2$; and $R_3$ is lower alkyl.

U.S. Pat. No. 4,136,081, patented Jan. 23, 1979 to Minagawa et al provides 2,2,6,6-tetramethyl-4-piperidyl carboxylic acid esters of aliphatic tetracarboxylic acids, useful as stabilizers for organic polymeric materials, and having the general formula:

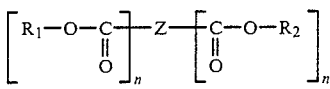

wherein:

$R_1$ is selected from the group consisting of

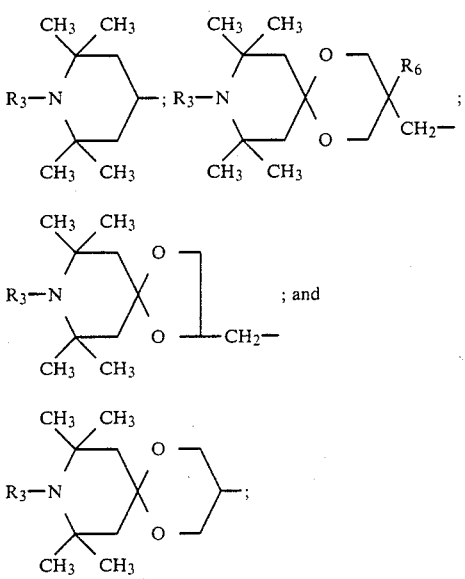

and when a is 2, 3, or 4, the $R_1$ groups can be the same or different;

$R_2$ is selected from the group consisting of hydrogen; alkyl; alkenyl; cycloalkyl; alkcycloalkyl; cycloalkalkyl; aryl; aralkyl; and alkaryl; and when b is 2 or 3, the $R_2$ groups can be the same or different;

$R_3$ is selected from the group consisting of hydgrogen and O;

$R_6$ is lower alkyl;

a is selected from the group consisting of 1, 2, 3 and 4;

b is selected from the group consisting of 0, 1, 2 and 3;

a+b is equal to 4; and Z is a tetravalent aliphatic or cycloaliphatic radical carrying four

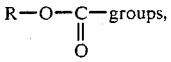

where R is $R_1$ or $R_2$, and can include from one to three hydroxyl groups OH.

U.S. Pat. No. 4,212,974, patented July 15, 1980 to Murayama et al provides piperidine derivatives useful as stabilizers for polymeric materials having the formula:

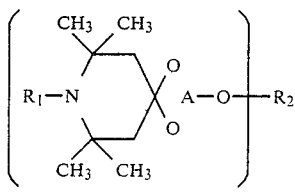

wherein $R_1$ represents hydrogen atom, an alkyl group, a substituted alkyl group, an alkenyl group, an alknyl group, a substituted or unsubstituted aralkyl group, an aliphatic acyl group, an alkoxycarbonyl group or an aralkoxycarbonyl group, n is an integer of 1 to 4; when n is 1, $R_2$ represents hydrogen atom, an aliphatic, aromatic or heterocyclic monoacyl group, an alkyl group, an alkenyl group, an alkynyl group, an aralkyl group, an aryl group, an alkoxyalkyl group, an epoxyalkyl group, an alkoxysulfonylalkyl group, a N-substituted carbamoyl group, a N-substituted thiocarbamoyl group, a monovalent group from an oxoacid or group

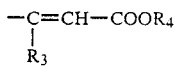

in which $R_3$ represents hydrogen atom, a lower alkyl group or phenyl group and $R_4$ represents an alkyl group; when n is 2, $R_2$ represents carbonyl group, an aliphatic or aromatic diacyl group, an alkylene group, an alkenylene group, an alkynylene group, an aralkylene group, a N-substituted dicarbamoyl group or a divalent group from an oxoacid; when n is 3, $R_2$ represents an aromatic triacyl group or a trivalent group from an oxoacid; and when n is 4, $R_2$ represents an aromatic tetraacyl group, and A represents a group

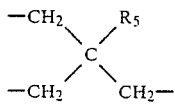

in which $R_5$ represents hydrogen atom or a lower alkyl group or, when n is 1, $R_5$ represents together with $R_2$ a group

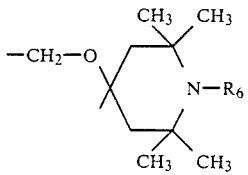

in which $R_6$ represents the same group as defined in $R_1$ and may be the same or different from $R_1$, or a group

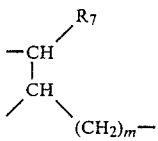

in which n is 1 or 2 and $R_1$ represents hydrogen atom or, when n and m are 1, $R_7$ represents methylene group together with $R_2$.

U.S. Pat. No. 4,312,804, patented Jan. 26, 1982 to Minagawa et al provides 2,2,6,6-tetraalkyl-4-piperidyl alcohol esters of tetradecylene polycarboxylic acids, useful as light stabilizers for organic polymeric materials, and having the general formula:

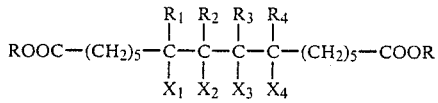

in which
R is selected from the group consisting of

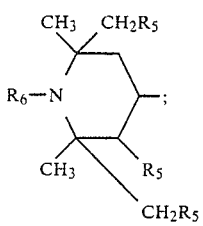

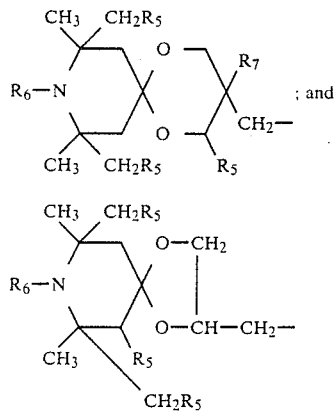

wherein:
$R_3$ and $R_6$ are each hydrogen or lower alkyl or hydroxylalkyl having from one to about six carbon atoms;
$R_7$ is lower alkyl having from one to about six carbon atoms;
$R_1$, $R_2$, $R_3$ and $R_4$ are selected from the group consisting of hydrogen and methyl;
$X_1$ and $X_3$ are selected from the group consisting of hydrogen and COOR;
$X_2$ and $X_4$ are selected from the group consisting of COOR and

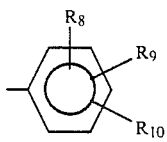

wherein
$R_8$, $R_9$, and $R_{10}$ are selected from the group consisting of hydrogen, hydroxy, alkyl, and alkoxy having from one to about eighteen carbon atoms.
However, many of these compounds are unstable to hydrolysis, and their volatility is high.
U.S. Pat. No. 4,232,131, patented Nov. 4, 1980 to Rody et al and U.S. Pat. Nos. 4,233,410 and 4,233,412, patented Nov. 11, 1980, to Rody et al provide condensation polymers and addition polymers, the recurrent molecular unit of which contains a polyalkylpiperidien radical of the formula

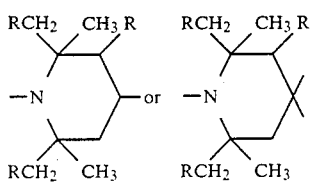

or is substituted by a polyalkylpiperidine side group of the formula

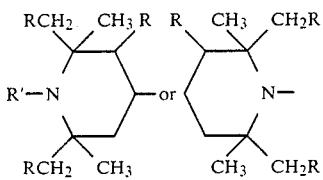

in which R denotes hydrogen or alkyl with 1–5 C atoms and R1 denotes hydrogen, alkyl with 1–12 C atoms, alkenyl with 3–8 C atoms, alkinyl with 3–6 C atoms, aralkyl with 7–12 C atoms, alkanoyl with 1–8 C atoms or alkenoyl with 3–5 C atoms, and to copolymers with one another or with polyalkylpiperidine-free components.

Such condensation polymers and addition polymers are manufactured by a polycondensation reaction or polyaddition reaction and possess hetero-atoms in the polymer chain. Examples of such polymers are polyesters, polyethers, polyamides, polyamines, polyurethanes, polyureas, polysulphides, polysulphones, polyimides, polysulphonates, polyphosphates, polyphosphonates, polysilyl esters, polysiloxanes, polyhydrazides, polyhydrazines or polybenzimidazoles.

The Rody et al polymers are derived from dicarboxylic acids. These piperidine polymers are said to have improved hydrolysis stability and lower volatility, but it has been suggested recently that polymers containing a piperidyl group in the repeating polymeric unit decompose and yield low molecular weight compounds due to the scission of the C–N bond upon exposure to ultraviolet light. Therefore, the stabilizing effect of these polymers is lost rapidly.

In accordance with the present invention, oligomers of glycols or diamines with polycarboxylic acid esters containing one or more 2,2,6,6-tetramethylpiperidyl groups in the repeating polymeric unit in the molecule are provided that have high hydrolytic stability and low volatility with an excellent stabilizing effect, compared to the Rody et al polymers. These stabilizers have the following formula

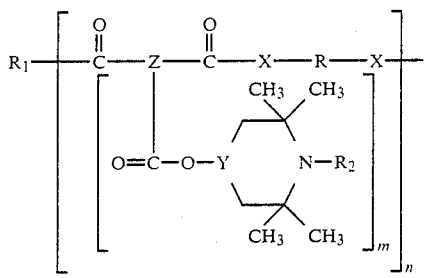

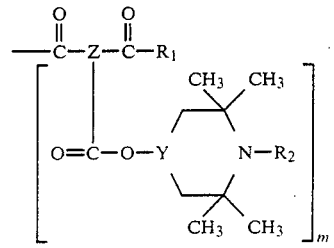

wherein:

is the residue of a member selected from the group consisting of aliphatic, aromatic, nitriloaliphatic, and hydroxyaliphatic polycarboxylic acids having from three to six carboxylic acid groups and from one to thirty carbon atoms;

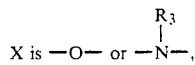

wherein $R_3$ is selected from the group consisting of hydrogen; alkyl and hydroxyalkyl having from one to about twenty carbon atoms; cycloalkyl having from six to about twenty carbon atoms; aryl having from six to about twenty carbon atoms; and cycloalkylene with the N in the ring and having from two to five carbon atoms;

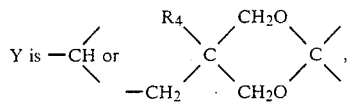

wherein $R_4$ is alkyl having from one to about six carbon atoms;

R is selected from the group consisting of alkylene having from two to about twelve carbon atoms; cycloalkylene having from three to about twelve carbon atoms; phenylene having from six to about twenty carbon atoms; mixed alkylenecycloalkylene, alkylene phenylene and oxyalkylene having from two to about twelve carbon atoms;

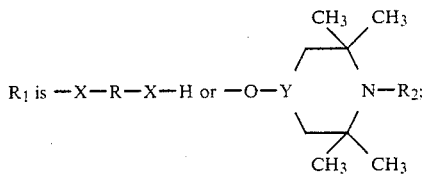

$R_2$ is selected from the group consisting of hydrogen; oxyl; alkyl having from one to about twenty carbon atoms; epoxyalkyl having from two to about six carbon atoms; hydroxyalkyl having from one to about six carbon atoms; acyl having from one to about six carbon atoms; aroyl having from seven to about twenty carbon atoms; and alkaryl having from seven to about twenty carbon atoms;

m is a number from 1 to 4; and n is a number from 1 to 10.

Exemplary $R_2$ alkyl include methyl, ethyl, propyl, isopropyl, butyl, isobutyl, tert-butyl, amyl, isoamyl, sec-amyl, hexyl, isohexyl, tert-hexyl, heptyl, octyl, isooctyl, 2-ethylhexyl, nonyl, isononyl, decyl, dodecyl, octadecyl;

Exemplary $R_2$ alkaryl include benzyl, phenylethyl;

Exemplary $R_2$ hydroxyalkyl include 2-hydroxyethyl, 2-hydroxypropyl, 2-hydroxybutyl and 2,3-hydroxyhexyl.

Exemplary $R_2$ epoxyalkyl include 2,3-epoxypropyl; 2,3-epoxybutyl, 3,4-epoxybutyl and 3,4-epoxyhexyl.

Exemplary $R_2$ acyl include acetyl, propionyl, butyroyl, acryloyl, methacryloyl, octanoyl and benzoyl.

Exemplary $R_3$ alkyl include methyl, ethyl, propyl, iso-propyl, butyl, iso-butyl, sec-butyl, amyl, isoamyl, hexyl, octyl, iso-octyl, 2-ethylhexyl, t-octyl, decyl, dodecyl, tetradecyl and octadecyl;

Exemplary $R_3$ cycloalkyl include cyclo hexyl, cycloheptyl, methyl cyclohexyl and octyl cyclohexyl.

Exemplary $R_3$ aryl include phenyl, naphtyl, tolyl, xylyl, t-butylphenyl, octylphenyl, 2,4-di-t-butylphenyl, nonylphenyl and dinonylphenyl, Exemplary $R_3$ cycloalkylene with N in the ring include methylene, ethylene, 1,2-propylene and 1,3-propylene.

Exemplary $R_4$ alkyl include methyl, ethyl, propyl, butyl and iso-butyl.

R is the alkylene or mixed alkylene cycloalkylene or alkylene phenylene residue of a glycol or diamine.

Exemplary glycols HO-R-OH include ethylene glycol, diethylene glycol, triethylene glycol, 1,2-propylene glycol, 1,4-butylene glycol, thiodiethanol, 1,6-hexanediol, 3-methylpentane-1,5-diol, neopentyl glycol, 1,10-decanediol, 1,12-dodecanediol, cyclohexane dimethanol, benzene dimethanol, hydrogenated Bisphenol A, 2-butene-1,4-diol, and 3,9-bis (1,1-dimethyl-2-hydroxyethyl)-2,4,8,10-tetraoxaspiro [5.5]undecane;

Exemplary diamines

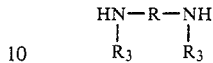

include ethylene diamine, 1,3-propylene diamine, 1,6-hexamethylene diamine, 1,8-octane diamine, 1,10-decane diamine, 1,11-undecane diamine, xylylene diamine, bis(aminomethyl) cyclohexane, isophorone diamine, bis (aminocyclohexyl) methane, 3,9-bis (3-aminopropyl)-2,4,8,10-tetraoxaspiro [5.5] undecane, piperidine and 2,5-dimethylpiperidine;

is the residue of a polycarboxylic acid $(COOH)_{2+m}$.

Exemplary polycarboxylic acids include tricarballylic acid, citric acid, acetylcitric acid, butane-1,2,3-tricarboxylic acid, 3-butene-1,2,3-tricarboxylic acid, trimellitic acid, butane-1,2,3,4-tetracarboxylic acid, 1,1,2,2-ethenetetracarboxylic acid, 7-bicyclo [2.2.2] octene-2,3,5,6-tetracarboxylic acid, 1,1,2,3-propanetetracarboxylic acid, pyromellitic acid, 1,6,8,14-tetradecanetetracarboxylic acid, 1,6,7,8,9,14-tetradecanehexacarboxylic acid, nitrilotriacetic acid and nitrilotripropionic acid.

Typical compounds are shown below:

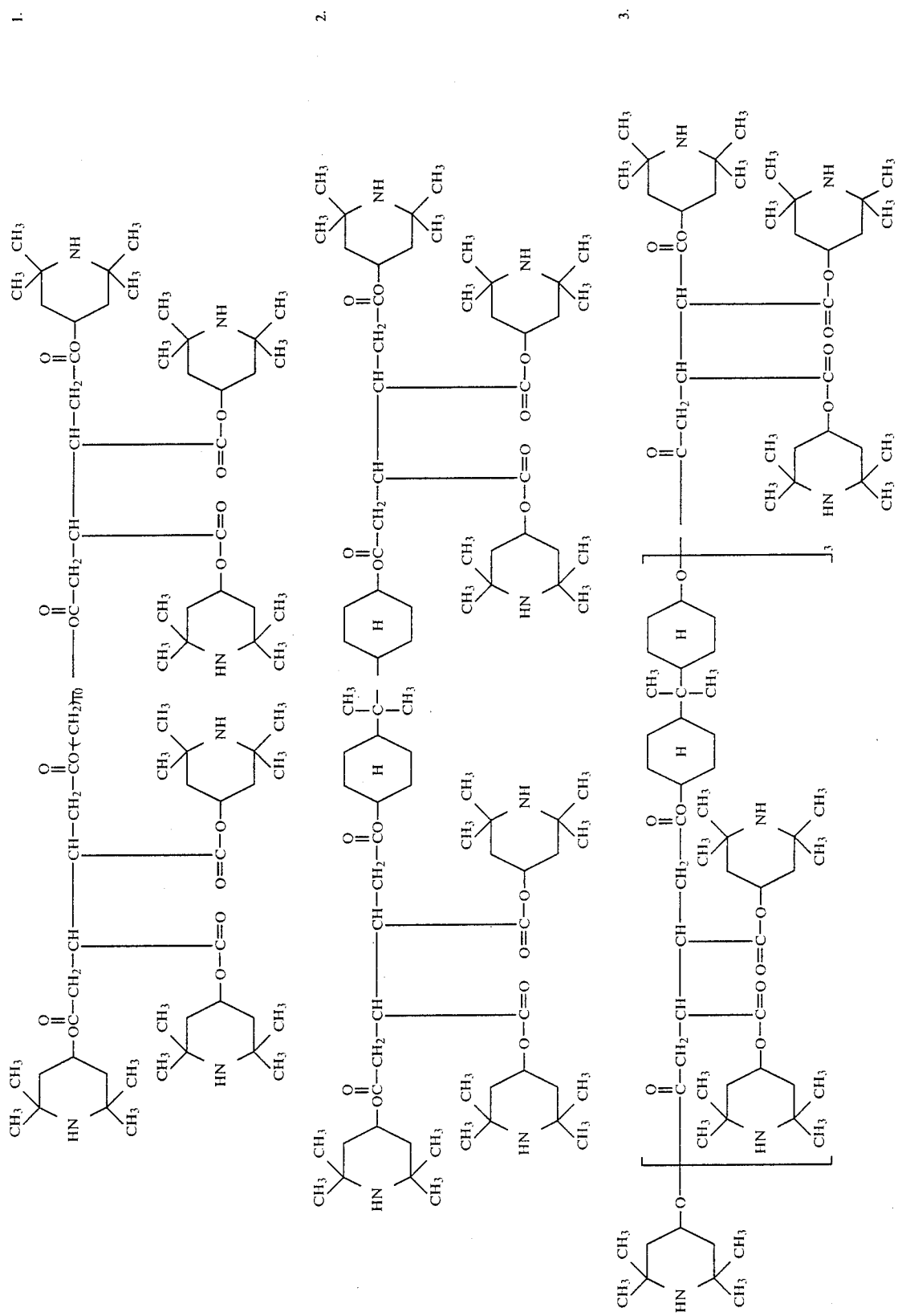

4.
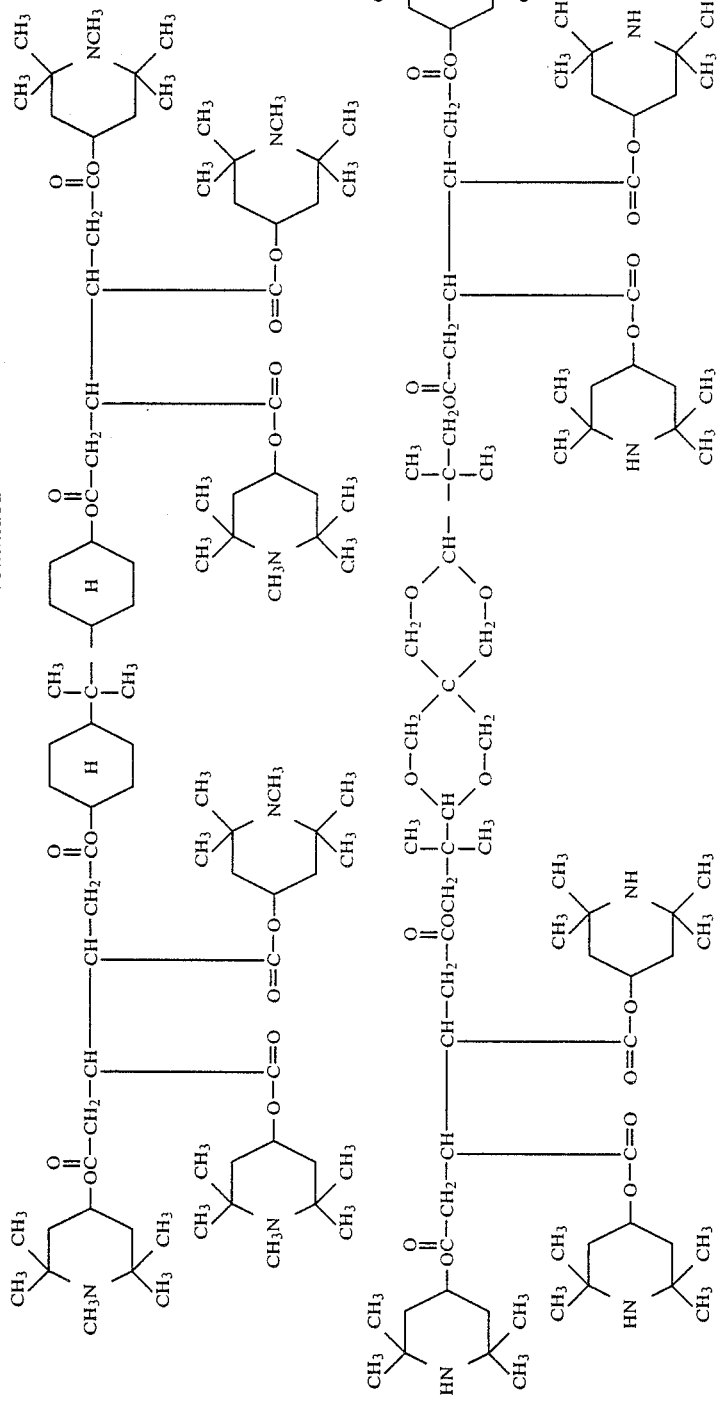
5.
6.
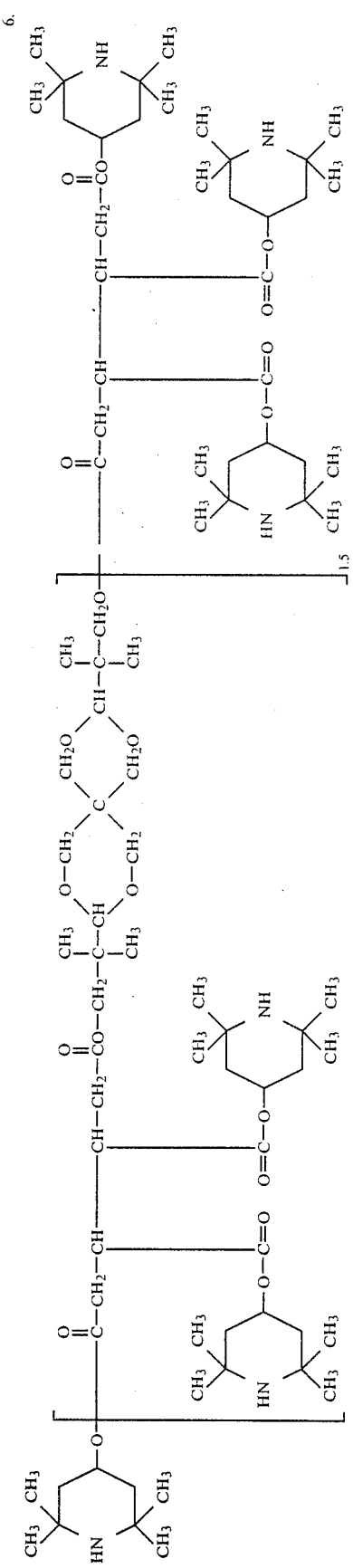

-continued
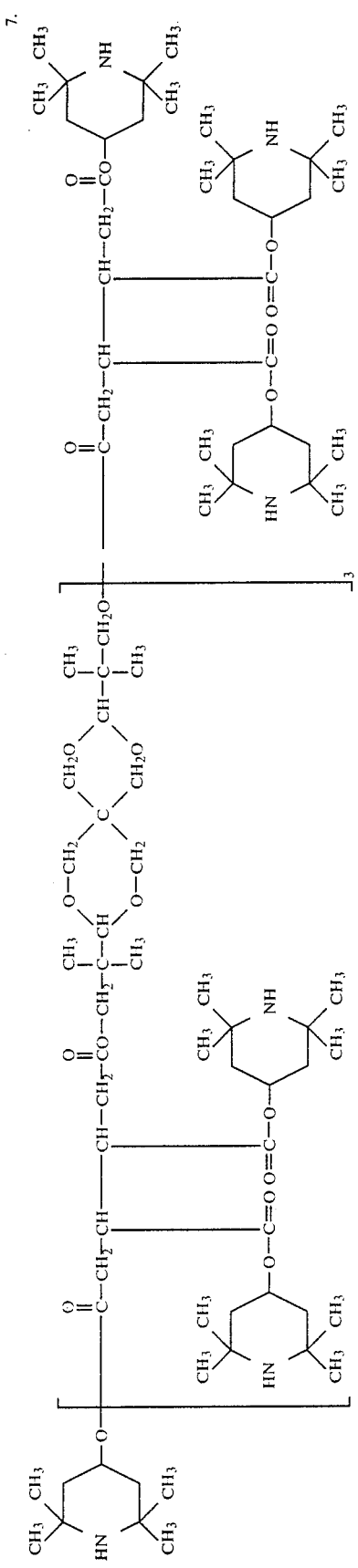
7.
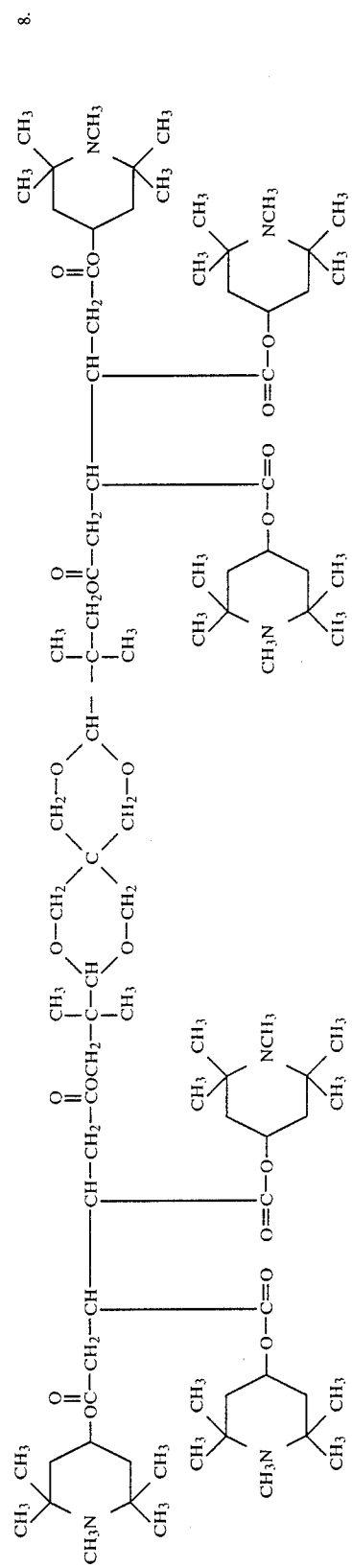
8.

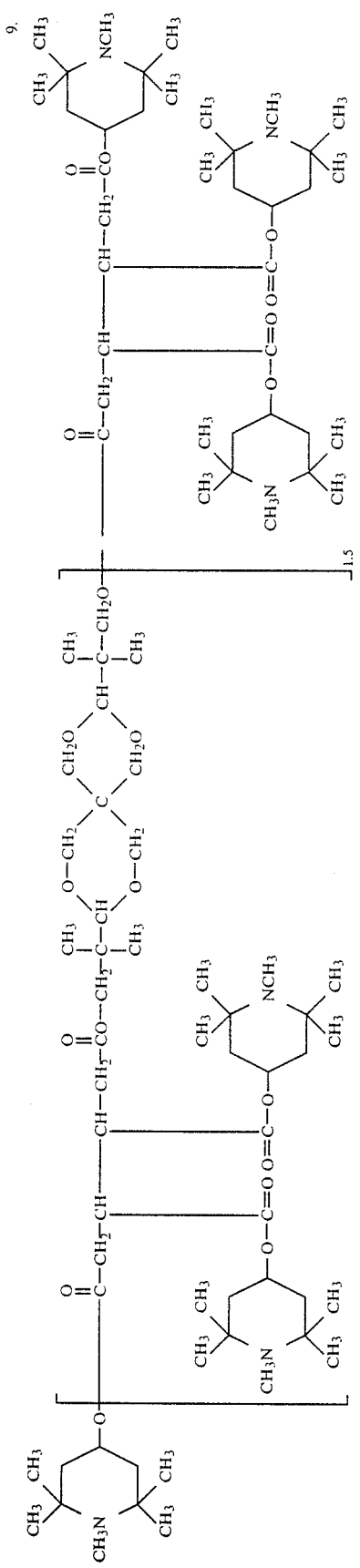
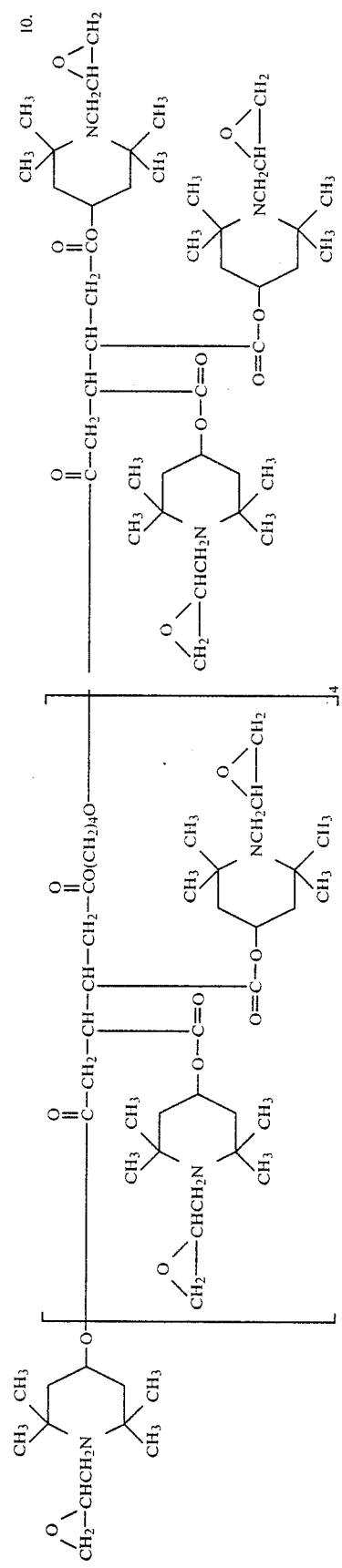

-continued
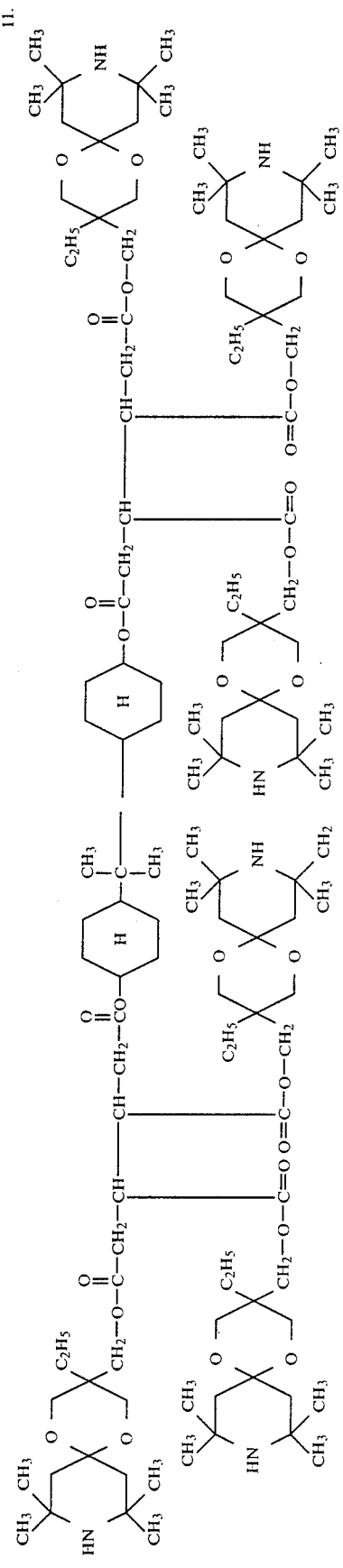
11.
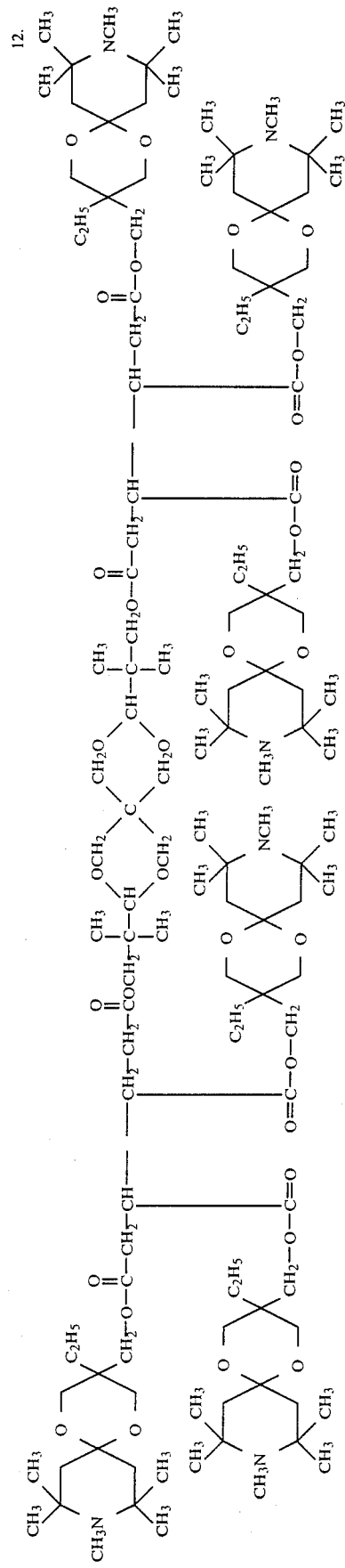
12.

-continued
13.
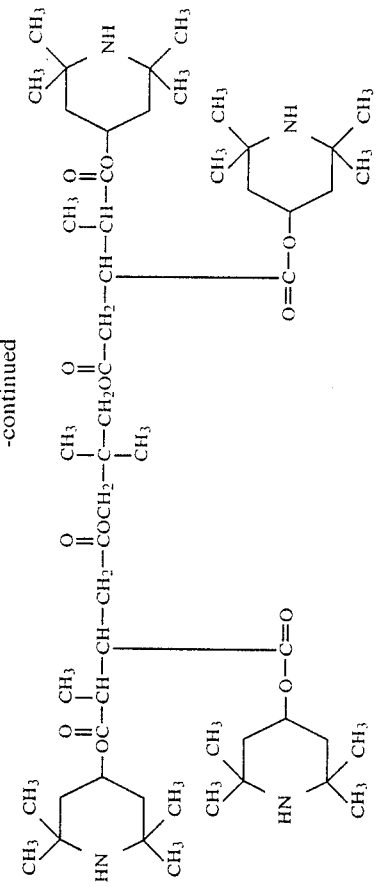
14.
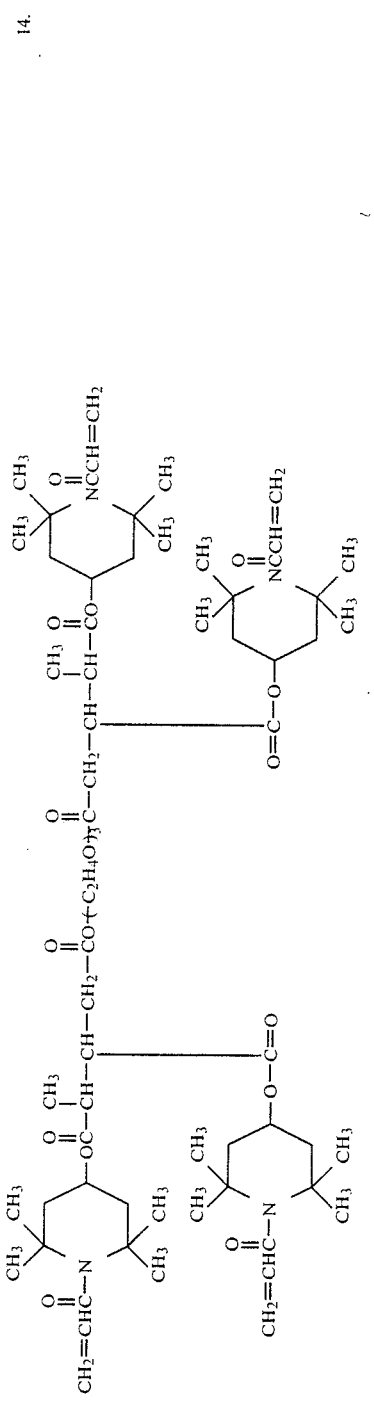
15.
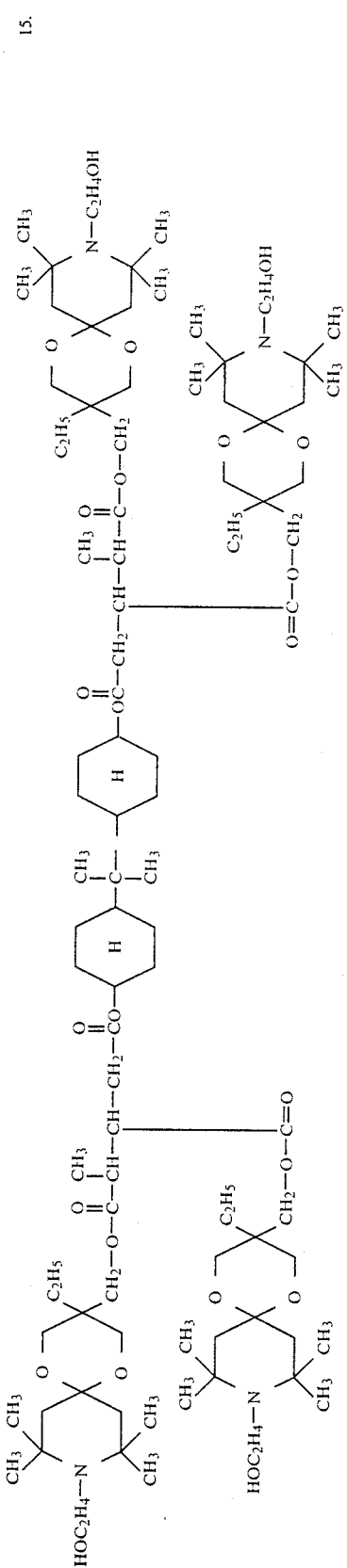

16.
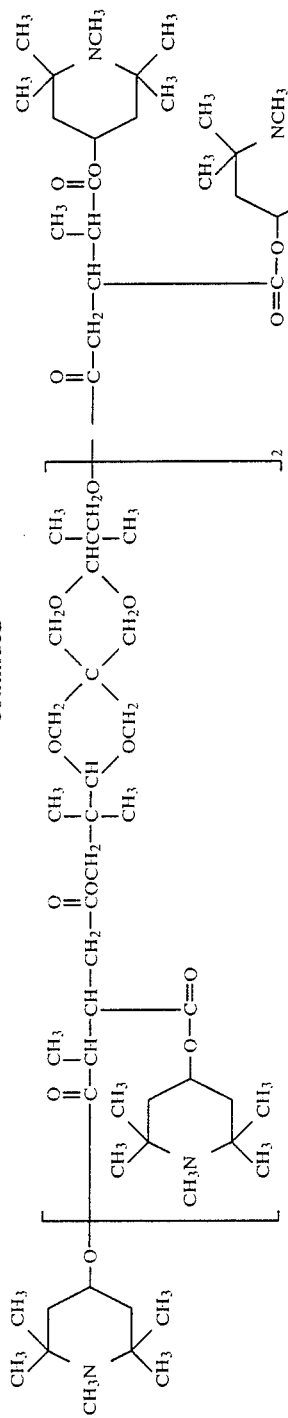
17.
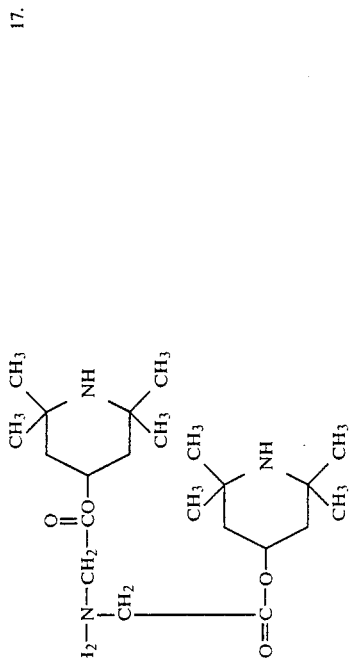
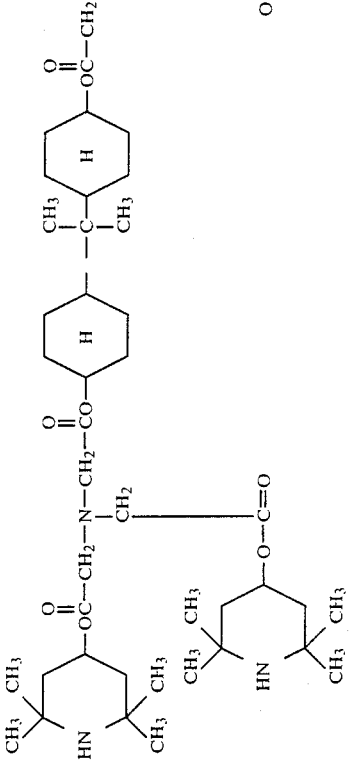
18.
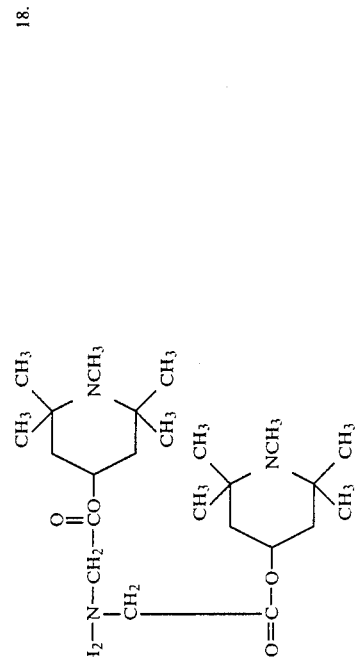
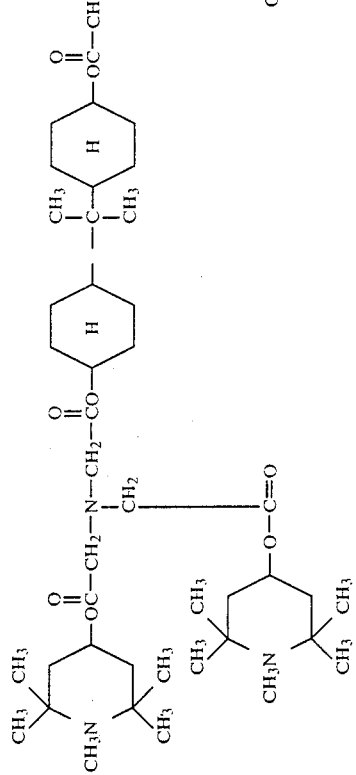

19.
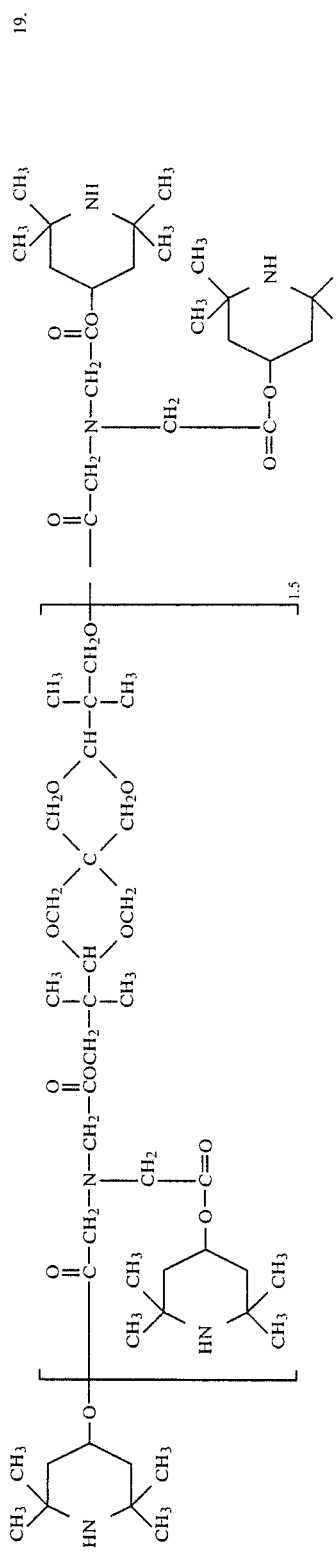
20.
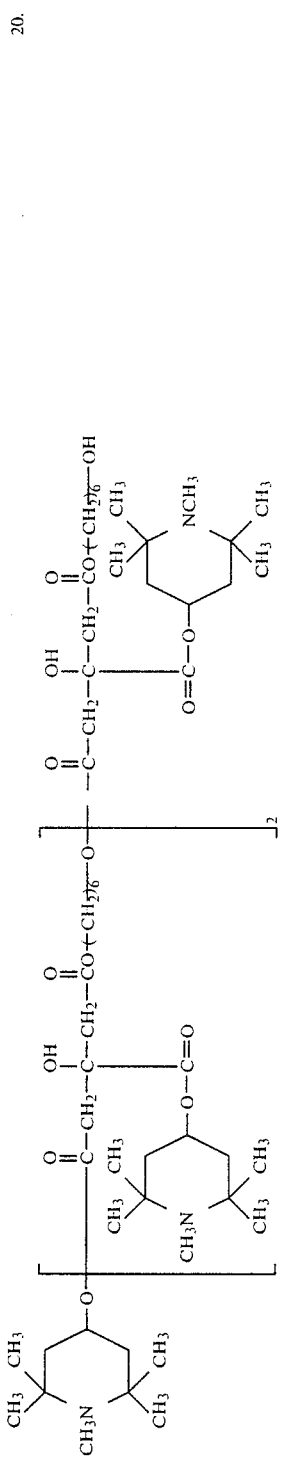
21.
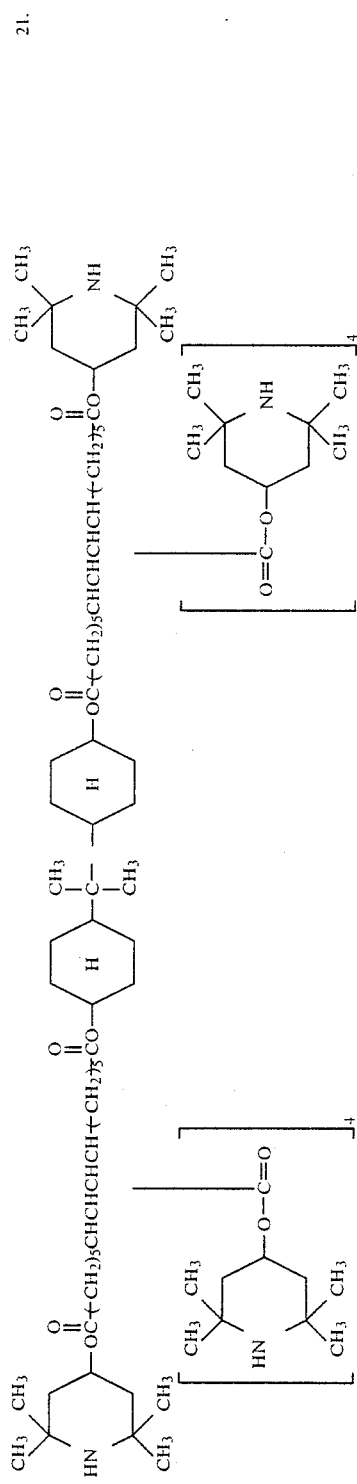

22.
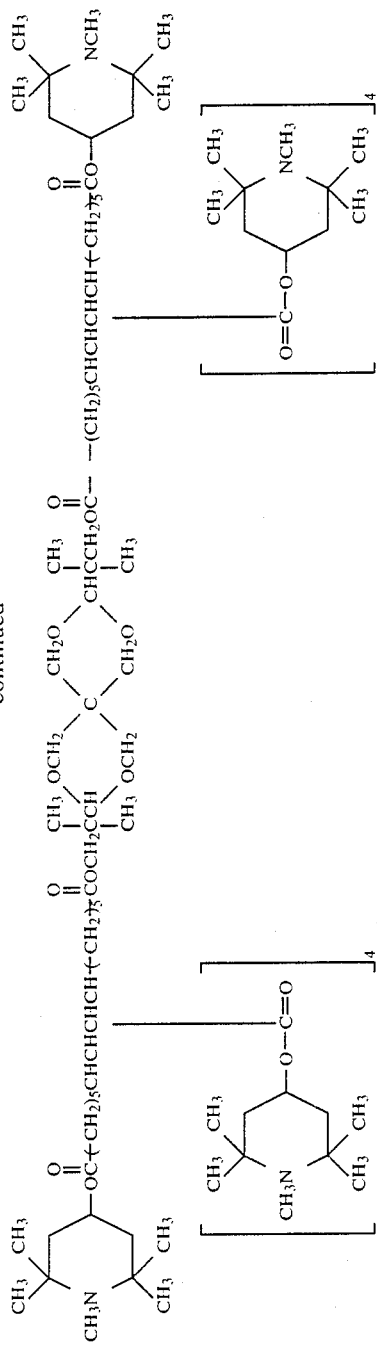
23.
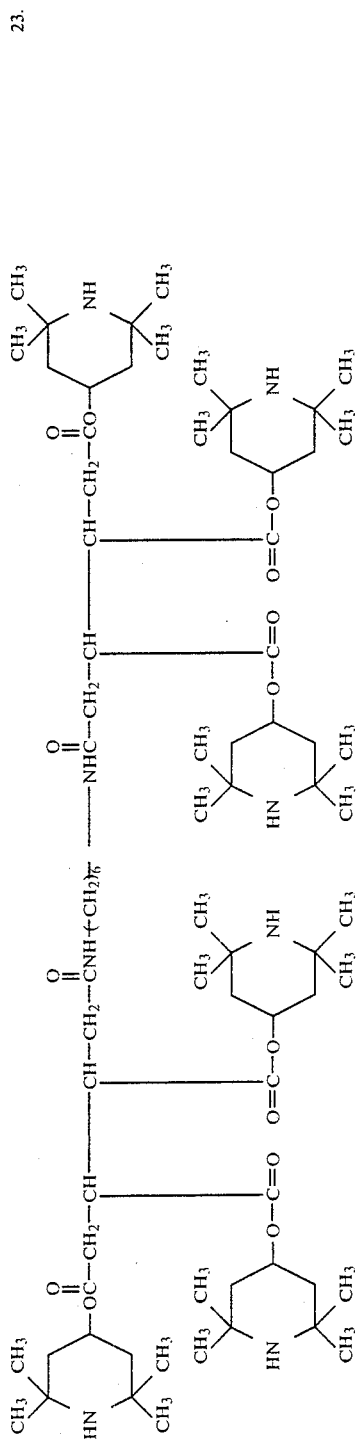
24.
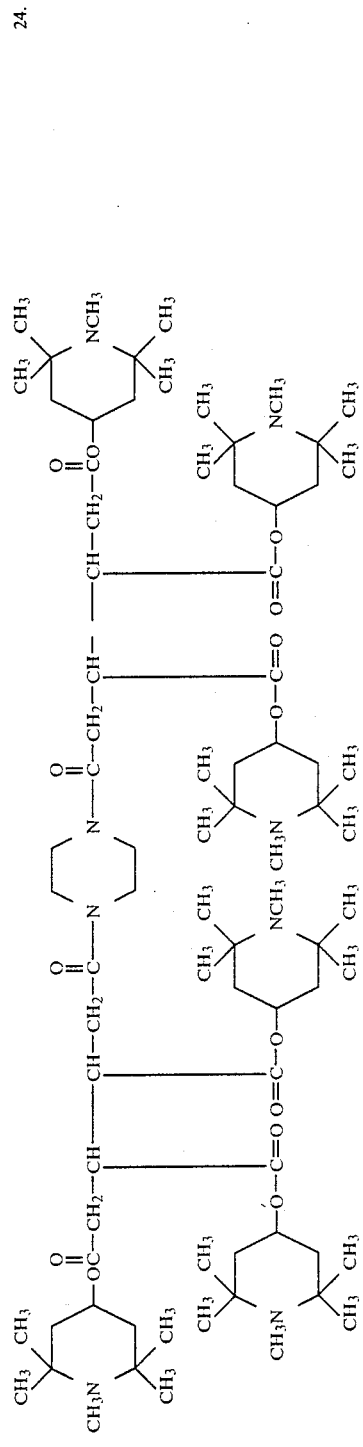

The compounds of the invention can be readily prepared by reacting the lower alkyl ester of the corresponding polycarboxylic acid with the corresponding 2,2,6,6-tetramethylpiperidyl alcohol

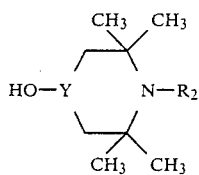

and with the corresponding glycol HOROH or diamine

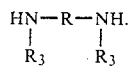

The following Examples are illustrative:

EXAMPLE I

Preparation of

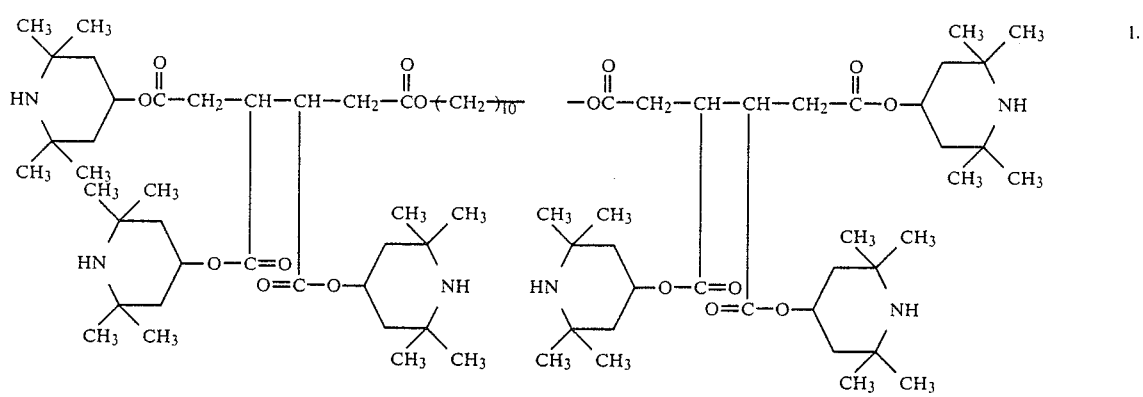

Tetramethyl-butane-1,2,3,4-tetracarboxylate 14.5 g, 2,2,6,6-tetramethyl-4-piperidinol 26.0 g and tetra-iso-propyltitanate 0.8 g were dissolved in 50 ml of mineral spirits and heated and stirred for 6 hours at 160°–165° C. under a stream of nitrogen. 1,10-decanediol 4.4 g and tetra-iso-propyltitanate 0.2 g were added, and the reaction mixture heated and stirred for an additional 6 hours at 160°–165° C. under a reduced pressure of 30 cm Hg. The solvent and excess 2,2,6,6-tetramethyl-4-piperidinol were distilled off under reduced pressure. Xylene 40 ml was added, and the mixture washed with water and dried. The xylene was then distilled off. A pale brown solid, m.p. 50°–55° C., was obtained.

EXAMPLE II

Preparation of

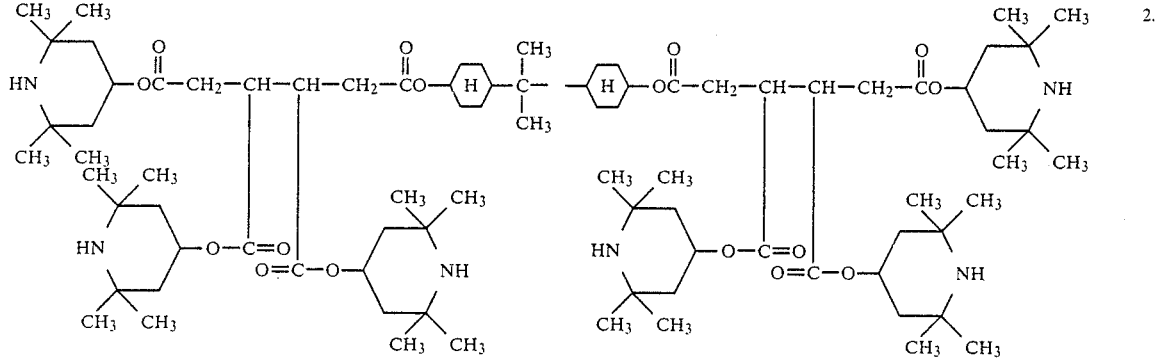

Tetramethyl-butane-1,2,3,4-tetracarboxylate 14.5 g, 2,2,6,6-tetramethyl-4-piperidinol 26.0 g and tetra-iso-propyltitanate 0.8 g were dissolved in 50 ml of mineral spirits, and heated and stirred for 6 hours at 160°–165° C. under a stream of nitrogen. Hydrogenated Bisphenol A 6.0 g and tetra-iso-propyltitanate 0.2 g were added, and the reaction mixture heated and stirred an additional 6 hours at 160°–165° C., under a reduced pressure of 30 cm Hg. The solution was worked up as in Example I. A pale brown solid, m.p. 80°–85° C., was obtained.

EXAMPLE III

Preparation of

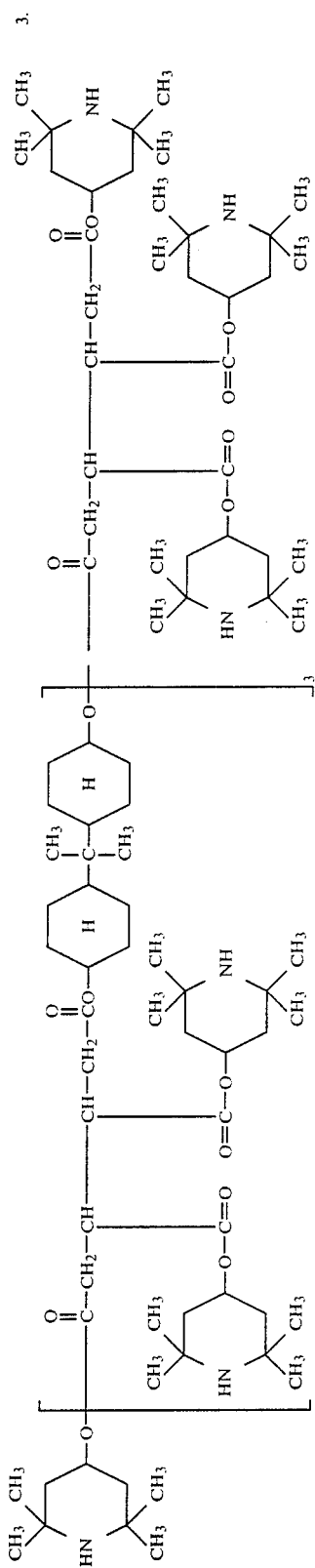

Tetramethyl-butane-1,2,3,4-tetracarboxylate 5.8 g, 2,2,6,6-tetramethyl-4-piperidinol 8.6 g and tetra-isopropyltitanate 0.4 g were dissolved in 25 ml of mineral spirits. The mixture was heated and stirred for 5 hours at 160°–165° C. under a stream of nitrogen. Hydrogenated Bisphenol A 3.6 g was added, and the mixture heated and stirred for an additional 6 hours at 160°–165° C. The solution was worked up as in Example I. A pale brown solid, m.p. 92°–94° C., was obtained.

EXAMPLE IV

Preparation of

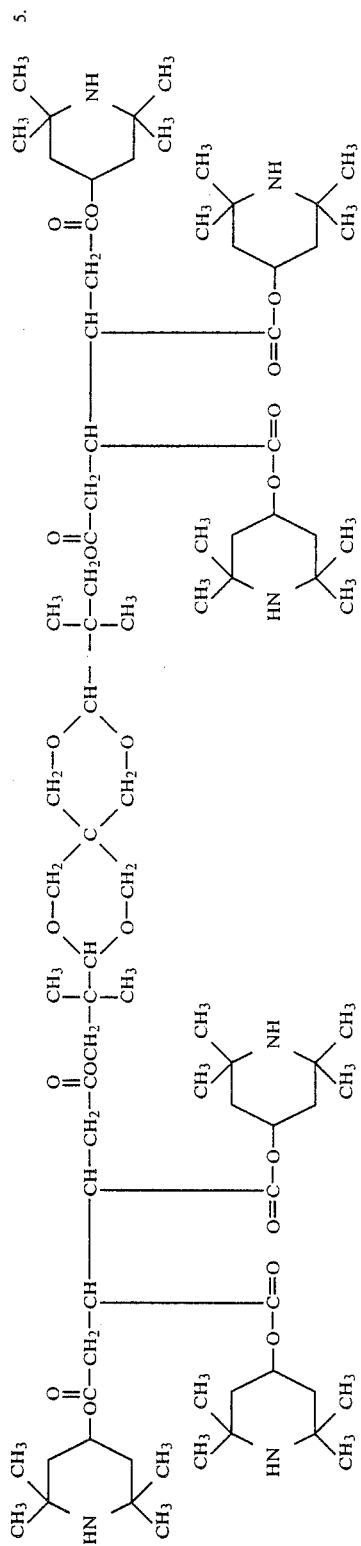

Tetramethyl-butane-1,2,3,4-tetracarboxylate 5.8 g, 2,2,6,6-tetramethyl-4-piperidinol 10.4 g and tetra-isopropyltitanate 0.4 g were dissolved in 25 ml of mineral spirits. The mixture was heated and stirred for 5 hours at 160°–165° C. under a stream of nitrogen. 3,9-Bis(1,1-dimethyl-2-hydroxyethyl)-2,4,8,10-tetraoxaspiro [5.5] undecane 3 g was added, and the mixture heated and stirred for an additional 6 hours at 160°–165° C. The solution was worked up as in Example I. A plae brown solid, m.p. 75°–80° C., was obtained.

EXAMPLE V

Preparation of

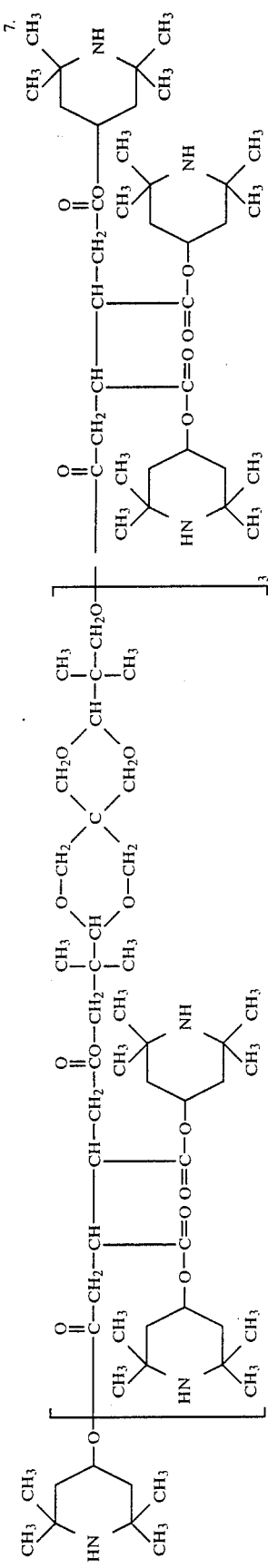

Tetramethyl-butane-1,2,3,4-tetracarboxylate 5.8 g, 2,2,6,6-tetramethyl-4-piperidinol 8.6 g and tetra-isopropyltitanate 0.4 g were dissolved in 25 ml of mineral spirits, and the mixture heated and stirred for 5 hours at 160°–165° C. under a stream of nitrogen. 3,9-Bis(1,1-dimethyl-2-hydroxyethyl)-2,4,8,10-tetraoxaspiro [5.5] undecane 4.6 g was added, and the mixture then heated and stirred for an additional 6 hours. The solution was worked up as in Example I. A pale brown solid, m.p. 90°–95° C., was obtained.

Small amounts of the oligomers of 2,2,6,6-tetramethyl piperidyl carboxylic acid esters of this invention when combined with synthetic resin improve the light stability of the resin. The amount of the polymeric 2,2,6,6-tetramethyl piperidyl carboxylic acid ester is generally within the range from about 0.001 to about 5 parts by weight, preferably from about 0.01 to about 3 parts by weight, per 100 parts by weight of resin.

Synthetic resins that can have their resistance to deterioration enhanced with the oligomers according to this invention include α-olefin polymers such as polyethylene, polypropylene, polybutene-1, poly-3-methylbutene-1, and copolymers thereof, such as copolymers of ethylene, propylene and butene-1 with each other and with other copolymerizable mixtures thereof, such as ethylenevinyl acetate copolymer; ethylene-propylene copolymer; polystyrene; polyvinyl acetate; polyacrylic esters; copolymers from styrene and another monomer (for example, maleic anhydride, butadiene, and acrylonitrile); acrylonitrile-butadiene-styrene copolymer, acrylic acid ester-butadiene-styrene copolymer, methacrylic acid ester-butadiene-styrene copolymer, polymethacrylate esters such as polymethacrylate; polyvinyl alcohol; polyvinyl formal; polyvinyl butyral; polyphenyleneoxides; linear polyesters such as polyethyleneterephthalate and polybutyleneterephthalate; polyamides such as polycaprolactam and polyhexamethyleneadipamide; polycarbonates; polyacetals; polyurethanes; cellulosic resins; phenol-formaldehyde resins; urea-formaldehyde resins; melamine-formaldehyde resins; epoxy resins; unsaturated polyester resins; silicone resins; halogen-containing resins such as polyvinyl chloride, polyvinyl bromide, polyvinyl fluoride, polyvinylidene chloride, polyvinylidene fluoride, and copolymers thereof, chlorinated polyethylene, chlorinated polypropylene, copolymers of vinylchloride with other copolymerizable monomers such as vinyl acetate, ethylene, propylene, styrene, isobutene, vinylidene chloride, maleic anhydride, acrylonitrile, butadiene, isoprene, acrylic esters and maleic esters; and rubbers such as polyisoprene rubber, polybutadiene rubber, epichlorohydrin rubber, chloroprene rubber, chlorinated rubber and blends of any of the above.

The polymeric 2,2,6,6-tetraalkyl piperidyl carboxylic acid esters of the invention can be combined with conventional heat stabilizers such as phenolic antioxidants, polyvalent metal salts of organic acids, organic phosphites, thioethers, and other known heat stabilizers, thereby constituting light and heat stabilizer compositions of the invention.

The phenolic antioxidant contains one or more phenolic hydroxyl groups, and one or more phenolic nuclei, and can contain from about eight to about three hundred carbon atoms. In addition, the phenolic nucleus can contain an oxy or thio ether group.

The alkyl-substituted phenols and polynuclear phenols, because of their molecular weight, have a higher boiling point, and therefore are preferred because of their lower volatility. There can be one or a plurality of alkyl groups of one or more carbon atoms. The alkyl group or groups including any alkylene groups between phenol nuclei preferably aggregate at least four carbon atoms. The longer the alkyl or alkylene chain, the better the compatibility with polypropylene, in as much as the phenolic compound then acquires more of an aliphatic hydrocarbon character, and therefore there is no upper limit on the number of alkyl carbon atoms. Usually, from the standpoint of availability, the compound will not have more than about eighteen carbon atoms in an alkyl, alicyclidene and alkylene group, and a total of not over about fifty carbon atoms. The compounds may have from one to four alkyl radicals per phenol nucleus.

The phenol contains at least one and preferably at least two phenolic hydroxyls, the two or more hydroxyls being in the same ring, if there is only one. In the case of bicyclic phenols, the rings can be linked by thio or oxyether groups, or by alkylene, alicyclidene or arylidene groups.

The monocyclic phenols which can be employed have the structure:

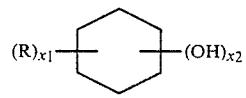

R is selected from the group consisting of hydrogen; halogen; and organic radicals containing from one to about thirty carbon atoms, such as alkyl, aryl, alkenyl, alkaryl, aralkyl, cycloalkenyl, cycloalkyl, alkoxy, and acyl

where R' is aryl, alkyl or cycloalkyl.

$x_1$ and $x_2$ are integers from one to four, and the sum of $x_1$ and $x_2$ does not exceed six.

The polycyclic phenol phenol is one having at least two aromatic nuclei linked by a polyvalent linking radical, as defined by the formula:

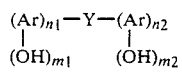

wherein

Y is a polyvalent linking group selected from the group consisting of oxygen; carbonyl; sulfur; sulfinyl; aromatic, aliphatic and cycloaliphatic hydrocarbon groups; and oxyhydrocarbon, thiohydrocarbon and heterocyclic groups. The linking group can have from one up to twenty carbon atoms.

Ar is a phenolic nucleus which can be a phenyl or a polycarbocyclic group having condensed or separate phenyl rings; each Ar group contains at least one free phenolic hydroxyl group up to a total of five. The Ar rings can also include additional rings connected by additional linking nuclei of the type Y, for example, Ar-Y-Ar-Y-Ar.

$m_1$ and $m_2$ are numbers from one to five, and $n_1$ and $n_2$ are numbers of one or greater, and preferably from one to four.

The aromatic nucleus Ar can, in addition to phenolic hydroxyl groups, include one or more inert substituents.

Examples of such inert substituents include hydrogen, halogen atoms, e.g., chlorine, bromine and fluorine; organic radicals containing from one to about thirty carbon atoms, such as alkyl, aryl, alkaryl, aralkyl, cycloalkenyl, cycloalkyl, alkoxy, aryloxy and acyloxy

where R' is aryl, alkyl or cycloalkyl, or thiohydrocarbon groups having from one to about thirty carbon atoms, and carboxyl

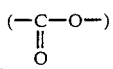

groups. Usually, however, each aromatic nucleus will not have more than about eighteen carbon atoms in any hydrocarbon substituent group. The Ar group can have from one to four substituent groups per nucleus.

Typical aromatic nuclei include phenyl, naphthyl, phenanthryl, triphenylenyl, anthracenyl, pyrenyl, chrysenyl, and fluoroenyl groups.

When Ar is a benzene nucleus, the polyhydric polycyclic phenol has the structure:

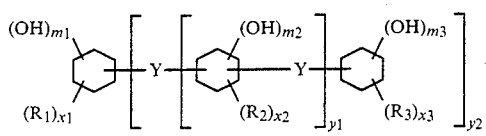

wherein $R_1$, $R_2$ and $R_3$ are inert substituent groups as described in the previous paragraph;

$m_1$ and $m_3$ are integers from one to a maximum of five; $m_2$ is an integer from one to a maximum of four; $x_1$ and $x_3$ are integers from zero to four, and $x_2$ is an integer from zero to three; $y_1$ is an integer from zero to about six and $y_2$ is an integer from one to five, preferably one or two.

Preferably, the hydroxyl groups are located ortho and/or para to Y.

Exemplary Y groups are alkylene, alkylidene, and alkenylene; arylene, alkyl arylene, arylalkylene; cycloalkylene, cycloalkylidene; and oxa- and thia-substituted such groups; tetrahydrofuranes, esters and triazino groups. The Y groups are usually bi, tri, or tetravalent, connecting two, three or four Ar groups. However, higher valency Y groups connecting more than four Ar groups, can also be used. According to their constitution, the Y groups can be assigned to subgenera as follows:

(1) Y groups where at least one carbon in a chain or cyclic arrangement connect the aromatic groups, such as:

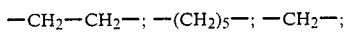

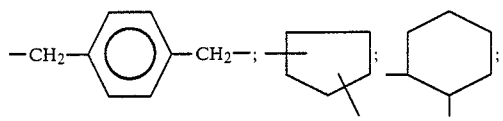

-continued

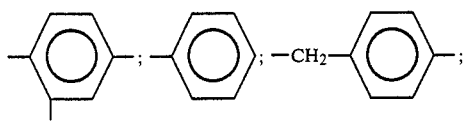

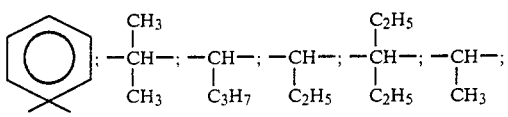

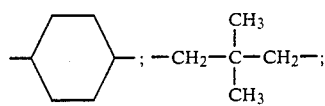

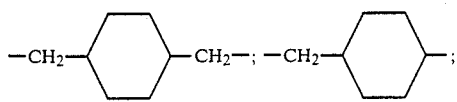

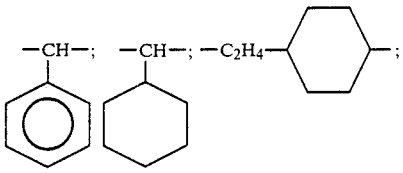

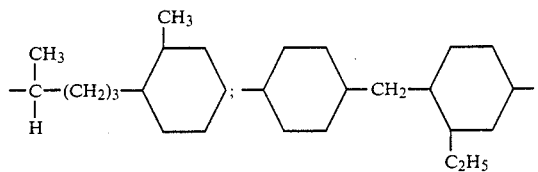

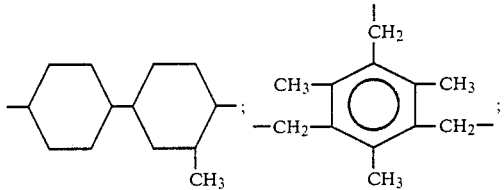

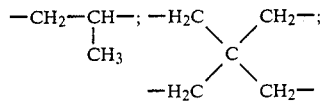

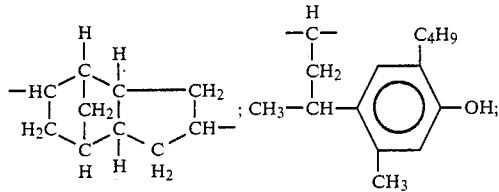

(2) Y groups where only atoms other than carbon link the aromatic rings, such as —O—, —S—,

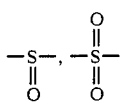

and —(S)$_x$— where x is a number from one to ten;

(3) Y groups made up of more than a single atom including both carbon and other atoms linking the aromatic nuclei, such as:

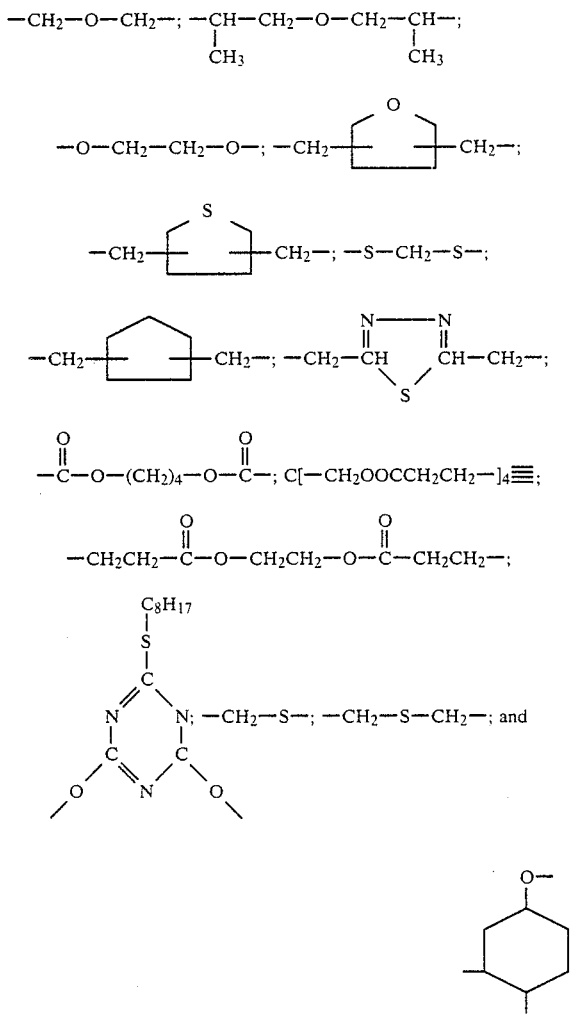

Although the relation of effectiveness to chemical structure is insufficiently understood, many of the most effective phenols have Y groups of subgenus (1), and accordingly this is preferred. Some of these phenols can be prepared by the alkylation of phenols or alkyl phenols with polyunsaturated hydrocarbons such as dicyclopentadiene or butadiene.

Representative phenols include guaiacol, resorcinol monoacetate, vanillin, butyl salicylate, 2,6-di-tert-butyl-4-methyl phenol, 2-tert-butyl-4-methoxy phenol, 2,4-dinonyl phenol, 2,3,4,5-tetradecyl phenol, tetrahydro-α-naphthol, o—, m— and p-cresol, o—, m— and p-phenylphenol, o—, m— and p-xylenols, the carvenols, symmetrical xylenol, thymol, o—, m— and p-nonyl-phenol, o—, m— and p-dodecyl-phenyl, and o—, m— and p-octyl-phenol, o—, and m-tert-butyl-p-hydroxy-anisole, p-n-decyloxy-phenol, p-n-decyloxy-cresol, nonyl-n-decyloxy-cresol, eugenol, isoeugenol, glyceryl monosalicylate, methyl-p-hydroxy-cinnamate, 4-benzyloxy-phenol, p-acetylaminophenol, p-stearyl-aminophenol, methyl-p-hydroxybenzoate, p-dichlorobenzoyl-aminophenol, p-hydroxysalicyl anilide, stearyl-(3,5-dimethyl-4-hydroxy-benzyl)thioglycolate, stearyl-β-(4-hydroxy-3,5-di-t-butylphenyl)propionate, distearyl-3,5-di-t-butyl-4-hydroxybenzylphosphonate, and distearyl (4-hydroxy-3-methyl-5-t-butyl)benzylmalonate.

Exemplary polyhydric phenols are orcinol, propyl gallate, catechol, resorcinol, 4-octyl-resorcinol, 4-dodecylresorcinol, 4-octadecyl-catechol, 4-isooctyl-phloroglucinol, pyrogallol, hexahydroxybenzene, 4-isohexylcatechol, 2,6-ditertiary-butyl-resorcinol, 2,6-diisopropyl-phloroglucinol.

Exemplary polyhydric polycyclic phenols are methylene bis-(2,6-di-tertiary-butyl-phenol), 2,2-bis-(4-hydroxy phnyl)propane, methylene-bis-(p-cresol), 4,4'-benzylidene bis (2-tertiary-butyl-5-methyl-phenol), 4,4'-cyclo-hexylidene bis-(2-tertiary-butylphenol), 2,2'-1-methylene-bis-(4-methyl-6-(1'-methyl-cyclohexyl)-phenol), 2,6-bis-(2'-hydroxy-3'-tertiarybutyl-5'-methyl-benzyl)-4-methylphenol, 4,4'-bis-(2-tertiarybutyl-5-methyl-phenol), 2,2'-bis-(4-hydroxy-phenyl)butane, ethylene bis-(p-cresol), 4,4'-oxobis-phenol, 4,4'-oxobis-(3-methyl-5-isopropyl-phenol), 4,4'-oxobis-(3-methyl-phenol), 2,2'-oxobis-(4-dodecyl-phenol), 2,2'-oxobis-(4-methyl-5-tertiary-butyl-phenol), 4,4'-thio-bis-phenol; 4,4'-thio-bis-(3-methyl-6-tertiary-butyl-phenol), 2,2'-thio-bis-(4-methyl-6-tertiary-butyl-phenol), 4,4'-n-butylidene-(2-t-butyl-5-methylphenol), 2,2'-methylene-bis-(4-methyl-6-(1'-methyl-cyclohexyl)-phenol), 4,4'-cyclohexylene bis-(2-tertiary-butyl-phenol), 2,6-bis-(2'-hydroxy-3'-t-butyl-5'-methyl-benzyl)-4-methyl-phenol, 4,4'-oxobis (naphthalene-1,5-diol), 1,3'-bis-(naphthalene-2,5-diol) propane, and 2,2'-butylene bis-(naphthalene-2,7-diol), (3-methyl-5-tert-butyl-4-hydroxyphenyl)-4'-hydroxy-phenyl) propane, 2,2'-methylene-bis-(4-methyl-5-isopropylphenol), 2,2'-methylene-bis-(4-methyl-5-isopropylphenol), 2,2'-methylene-bis-(5-tert-butyl-4-chlorophenol), (3,5-di-tert-butyl-4-hydroxyphenyl)-(4'-hydroxyphenyl)ethane, (2-hydroxyphenyl)(3',5'-di-tert-butyl-4',4-hydroxyphenyl)ethane, 2,2'-methylene-bis-(4-octylphenol), 4,4'-propylene-bis-(2-tert-butyl-phenol), 2,2'-isobutylene-bis-(4-nonyl-phenol), 2,4-bis-(4-hydroxy-3-t-butyl-phenoxy)-6-(n-octylthio)-1,3,5-triazine, 2,4,6-tris-(4-hydroxy-3-t-butyl-phenoxy)-1,3,5-triazine, 2,2'-bis-(3-t-butyl-4-hydroxyphenyl)thiazolo-(5,4-d)thiazole, 2,2'-bis-(3-methyl-5-t-butyl-4-hydroxyphenyl)thiazolo-(5,4-d)-thiazole, 4,4'-bis-(4-hydroxyphenyl)pentanoic acid octadecyl ester, cyclopentylene-4,4'-bis-phenol, 2-ethylbutylene-4,4'-bisphenol, 4,4'-cyclooctylene-bis-(2-cyclohexylphenol), ββ-thiodiethanol-bis-(3-tert-butyl-4-hydroxyphenoxy acetate), 1,4-butanedio-bis-(3-tert-butyl-4-hydroxyphenoxy acetate), pentaerythritol tetra-(4-hydroxyphenol propionate), 2,4,4'-tri-hydroxy benzophenone, bis-(2-tert-butyl-3-hydroxy-5-methylphenyl) sulfide, bis-(2-tert-butyl-4-hydroxy-5-methylphenyl) sulfide, bis-(2-tert-butyl-4-hydroxy-5-methylphenyl)sulfoxide, bis-(3-ethyl-5-tert-butyl-4-hydroxybenzyl)sulfide, bis-(2-hydroxy-4-methyl-6-tert-butyl-phenyl)sulfide, 4,4'-bis-(4-hydroxyphenol) pentanoic acid octadecyl thiopropionate ester, 1,1,3-tris-(2'-methyl-4-hydroxy-5'-tert-butylphenyl)butane, 1,1,3-tris-(1-methyl-3-hydroxy-4-tert-butylphenyl)butane, 1,8-bis-(2-hydroxy-5-methylbenzoyl-n-octane, 2,2'-ethylene-bis-[4'-(3-tert-butyl-4-hydroxyphenyl)-thiazole], 1-methyl-3-(3-methyl-5-tert-butyl-4-hydroxybenzyl)-naphthalene, 2,2'-(2-butene)-bis-(4-methoxy-6-tert-butylphenol)-bis-[3,3-bis-(4-hydroxy-3-t-butylphenyl)butyric acid] glycol ester, 4,4'-butylidene-bis-(6-t-butyl-m-cresol), 1,1,3-tris-(2-methyl-4-hydroxy-5-t-butylphenyl)butane, 1,3,5-tris-(3,5-di-t-butyl-4-hydroxybenzyl)-2,4,6-trimethylbenzene, tetrakis [methylene-3(3,5-di-t-butyl-4-hydroxyphenyl)propionate] methane, 1,3,5-tris-(3,5-di-t-butyl-4-hydroxybenzyl)isocyanurate, 1,3,5-tris(3,5-di-t-butyl-4-hydroxyphenyl)propionyl-oxyethyl isocyanurate, 2-octylthio-4,6-di-(4-hydroxy-3,5-di-t-butyl)phenoxy-1,3,5-triazine, 4,4'-thiobis-(6-t-butyl-m-cresol) and pentaerythritol hydroxyphenyl propionate.

A particularly desirable class of polyhydric polycyclic phenols are the dicyclopentadiene polyphenols, which are of the type:

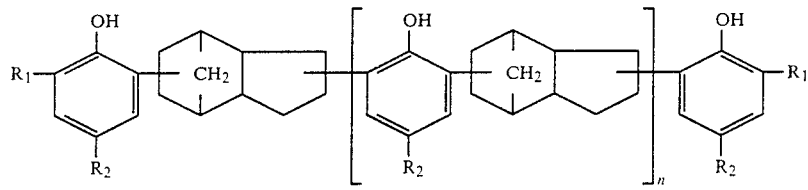

in which $R_1$ and $R_2$ are lower alkyl, and can be the same or different, and n is the number of the groups enclosed by the brackets, and is usually from 1 to about 5. These are described in U.S. Pat. No. 3,567,683, dated Mar. 2, 1971 to Spacht. A commercially available member of this class is Wingstay L, exemplified by dicyclopentadiene tri-(2-tert-butyl-4-methyl-phenol) of the formula:

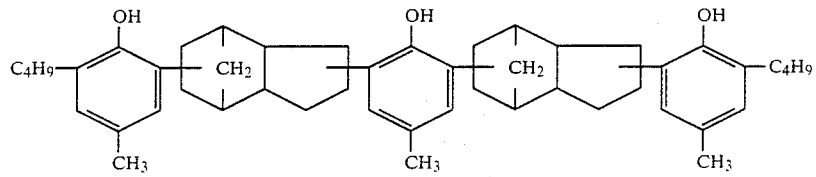

The polyhydric polycyclic phenols used in the invention can also be condensation products of phenols or alkylphenols with hydrocarbons having a bicyclic ring structure and a double bond or two or more double bonds, such as α-pinene, β-pinene, dipentene, limonene, vinylcyclohexene, dicyclopentadiene, allo-ocimene, isoprene and butadiene. These condensation products are usually obtained under acidic conditions in the form of more or less complex mixtures of monomeric and polymeric compounds. However, it is usually not necessary to isolate the individual constituents. The entire reaction product, merely freed from the acidic condensation catalyst and unchanged starting material, can be used with excellent results. While the exact structure of these phenolic condensation products is uncertain, the Y groups linking the phenolic nuclei all fall into the preferred subgenus 1. For method of preparation, see e.g., U.S. Pat. No. 3,124,555, U.S. Pat. No. 3,242,135, and British Pat. No. 961,504.

When the stabilizer composition is used in conjunction with a polyvalent metal salt of an organic acid, the organic acid will ordinarily have from about six to about twenty-four carbon atoms. The polyvalent metal can be any metal of Group II of the Periodic Table, such as zinc, calcium, cadmium, barium, magnesium and strontium. The alkali metal salts and heavy metal salts such as lead salts are unsatisfactory. The acid can be any organic non-nitrogeneous monocarboxylic acid having from six to twenty-four carbon atoms. The aliphatic, aromatic, alicyclic and oxygen-containing heterocyclic organic acids are operable as a class. By the term "aliphatic acid" is meant any open chain carboxylic acid, substituted, if desired, with nonreactive groups, such as halogen, sulfur and hydroxyl. By the term "alicyclic" it will be understood that there is intended any cyclic acid in which the ring is nonaromatic and composed solely of carbon atoms, and such acids may if desired have inert, nonreactive substituents such as halogen, hydroxyl, alkyl radicals, alkenyl radicals and other carbocyclic ring structures condensed therewith. The oxygen-containing heterocyclic compunds can be aromatic or nonaromatic and can include oxygen and carbon in the ring structure, such as alkyl-substituted furoic acid. The aromatic acids likewise can have nonreactive ring substituents such as halogen, alkyl and alkenyl groups, and other saturated or aromtaic rings condensed therewith.

As exemplary of the acids which can be used in the form of their metal salts there can be mentioned the following: hexoic acid, 2-ethylhexoic acid, n-octoic acid, isooctoic acid, capric acid, undecylic acid, lauric acid, myrisitc acid, palmitic acid, margaric acid, stearic acid, oleic acid, ricinoleic acid, behenic acid, chlorocaproic acid, hydroxy capric acid, benzoic acid, phenylacetic acid, butyl benzoic acid, ethyl benzoic acid, propyl benzoic acid, hexyl benzoic acid, salicylic acid, naphthoic acid 1-naphthalene acetic acid, orthobenzoyl benzoic acid, naphthenic acids derived from petroleum, abietic acid, dihydroabietic acid, hexahydrobenzoic acid, and methyl furoic acid.

The water-insoluble salts are preferred, because they are not leached out when the plastic is in contact with water. Where these salts are not known, they are made by the usual types of reactions, such as by mixing the acid, or anhydride with the corresponding oxide or hydroxide of the metal in a liquid solvent, and heating, if necessary, until salt formation 15 is complete.

A variety of organic triphosphites and acid phosphites can be employed, of which the following are exemplary.

The organic triphosphite can be any organic phosphite having three or more organic radicals attached to phosphorus through oxygen. The acid phosphite can be any organic phosphite having one or two organic radicals attached to phosphorus through oxygen. These radicals can be monovalent radicals, in the case of the triphosphites, diphosphites and monophosphites.

The organic triphosphites in which the radicals are monovalent radicals can be defined by the formula:

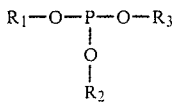

in which $R_1$, $R_2$ and $R_3$ are selected from the group consisting of alkyl, alkenyl, aryl, alkaryl, aralkyl, and cycloalkyl groups having from one to about thirty carbon atoms.

The acid phosphites are defined by the same formula, but one or two of $R_1$, $R_2$ $R_3$ is hydrogen or a cation of a metal or ammonium.

Also included are the organic triphosphites having a bivalent organic radical forming a heterocyclic ring with the phosphorus of the type:

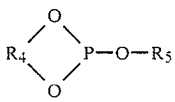

in which $R_4$ is a bivalent organic radical selected from the group consisting of alkylene, arylene, aralkylene, alkarylene and cycloalkylene radicals having from two to about thirty carbon atoms, and $R_5$ is a monovalent organic radical as defined above in the case of $R_1$, $R_2$ and $R_3$;

$R_5$ is hydrogen or a cation, in the case of the acid phosphites.

Also useful organic triphosphites are mixed heterocyclic-open chain phosphites of the type:

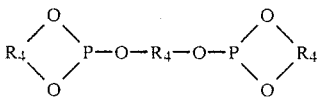

More complex triphosphites are formed from trivalent organic radicals, of the type:

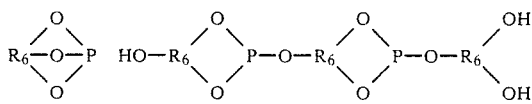

in which $R_6$ is a trivalent organic radical of any of the types of $R_1$ to $R_5$, inclusive, as defined above.

A particularly useful class of complex triphosphites are the tetraoxadiphosphaspiro undecanes of the formula:

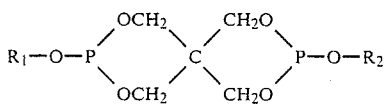

where $R_1$ and $R_2$ are selected from the group consisting of aryl, alkyl, aryloxyethyl, alkyloxyethyl, aryloxyethoxyethyl, alkyloxyethoxyethyl and alkyloxypolyethoxyethyl having from about 1 to about 30 carbon atoms.

In the case of the acid phosphites, one or both of $R_1$ and $R_2$ is also hydrogen or a cation.

An especially preferred class of organic triphosphites and acid phosphites have a bicyclic aromatic group attached to phosphorus through oxygen, with no or one or more phenolic hydroxyl groups on either or both of the aromatic rings. These phosphites are characterized by the formula;

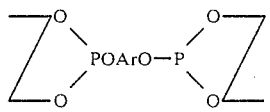

or

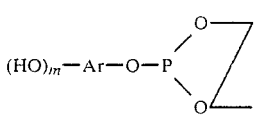

in which

Ar is a mono or bicyclic aromatic nucleus and m is an integer of from 0 to about 5. Z is one or a plurality of organic radicals as defined above for $R_1$ to $R_6$, taken singly or together in sufficient number to satisfy the valences of the two phosphite oxygen atoms.

One or both Z radicals is also hydrogen, in the case of the acid phosphites, and can include additional bicyclic aromatic groups of the type $(HO)_m$—Ar.

The cation in the case of acid phosphites can be a metal, such as an alkali metal, for instance, sodium, potassium or lithium; an alkaline earth metal, for instance, barium, calcium, or a nontoxic polyvalent metal, such as magnesium, tin and zinc.

Usually, the triphosphites and acid phosphites will not have more than about sixty carbon atoms.

Exemplary triphosphites are monophenyl di-2-ethylhexyl phosphite, diphenyl mono-2-ethylhexyl phosphite, di-isoctyl monotolyl phosphite, tri-2-ethylhexyl phosphite, phenyl dicyclohexyl phosphite, phenyl diethyl phosphite, triphenyl phosphite, tricresyl phosphite, tri(dimethylphenyl) phosphite, trioctadecyl phosphite, triisooctyl phosphite, tridodecyl phosphite, isooctyl diphenyl phosphite, diisooctyl phenyl phosphite, tri(t-octylphenyl) phosphite, tri-(t-nonylphenyl)phosphite, benzyl methyl isopropyl phosphite, butyl dicresyl phosphite, isooctyl di(octylphenyl) phosphite, di(2-ethylhexyl) (isooctylphenyl) phosphite, tri(2-cyclohexylphenyl)phosphite), tri-α-naphthyl phosphite, tri(phenylphenyl) phosphite, tri(2-phenylethyl) phosphite, ethylene phenyl phosphite, ethylene t-butyl phosphite, ethylene isohexyl phosphite, ethylene isooctyl phosphite, ethylene cyclohexyl phosphite, 2-phenoxy-1,3,2-dioxaphosphorinane, 2-butoxy-1,3,2-dioxyphosphorinane, 2-octoxy-5,5-dimethyl-dioxaphorinane, and 2-cyclohexyloxy-5,5-diethyl dioxaphosphorinane.

Exemplary pentaerythritol triphosphites are 3,9-diphenoxy-2,4,8,10-tetraoxa-3,9-diphosphaspiro-(5,5)-undecane (diphenyl-pentaerythritol diphosphite), 3,9-di(decyloxy)-2,4,8,10-tetraoxa-3,9-diphosphaspiro-(5,5)-undecane, 3,9-di(isodecyloxy)-2,4,8,10-tetraoxa-3,9-diphosphaspiro-(5,5)-undecane, 3,9-di(octadecyloxy)-2,4,8,10-tetraoxa-3,9-diphosphaspiro-(5,5)-undecane, 3-phenoxy-9-isodecyloxy-2,4,8,10-tetraoxa-3,9-diphosphaspiro-(-b 5,5)-undecane, 3,9-di(methoxy)-2,4,8,10-tetraoxa-3,9-diphosphaspiro-(5,5)-undecane, 3,9-di(lauryloxy)-2,4,8,10-tetraoxa-3,9-diphosphaspiro-(5,5)-undecane, 3,9-di-p-tolyloxy-2,4,8,10-tetraoxa-3,9-diphosphaspiro-(5,5)-undecane, 3,9-di(methoxyethyloxy)-2,4,8,10-tetraoxa-3,9-diphosphaspiro-(5,5)-undecane, 3-methoxyethyloxy-9-isodecyloxy-2,4,8,10-tetraoxa-3,9-di(ethoxyethyloxy)-2,4,8,10-tetraoxa-3,9-diphosphasiro-(5,5)-undecane, 3,9-di(butoxyethyloxy)-2,4,8,10-tetraoxa-3,9-diphosphaspiro-(5,5)-undecane, 3-methoxyethyloxy-9-butoxy-ethyloxy-2,4,8,10-tetraoxa-3,9-diphosphaspiro-(5,5)-undecane, 3,9-di(methoxyethoxyethyloxy)-2,4,8,10-tetraoxa-3,9-diphosphaspiro-(5,5)-undecane, 3,9-di-(butoxyethoxyethyloxy)-2,4,8,10-tetraoxa-3,9-diphosphaspiro-(5,5)-undecane, 3,9-di(methoxyethoxyethoxyethyloxy)-2,4,8,10-tetraoxa-3,9-diphosphaspiro-(5,5)-undecane, 3,9-di(methoxy (polyethoxy)ethyloxy)-2,4,8,10-tetraoxa-3,9-diphosphaspiro-(5,5)-undecane where the (polyethoxy)ethyloxy group has an average molecular weight of 350), 3,9-di(methoxy(polyethoxy)ethyloxy)-2,4,8,10-tetraoxa-3,9-diphosphaspiro-(5,5)-undecane (where the (polyethoxy) ethyloxy group has an average molecular weight of 550).

Exemplary of the bis aryl triphosphites are: bis(4,4'-thio-bis(2-tertiary-butyl-5-methyl-phenol)) isooctyl phosphite, mono(4,4'-thio-bis(2-tertiary-butyl-5-methyl-phenol)) di-phenyl phosphite, tri-(4,4'-n-butylidene-bis(2-tertiary-butyl-5-methylphenol)) phosphite, (4,4'-benzylidene-bis(2-tertiary-butyl-5-methyl-phenol)) di-phenyl phosphite, isooctyl 2,2'-bis(-parahydroxyphenyl) propane phosphite, decyl 4,4'-n-butylidene-bis (2-tertiary-butyl-5-methylphenol) phosphite, tri-4,4'-thio-bis(2-tertiary-butyl-5-methylpenol) phosphite, 2-ethylhexyl-2,2'-methylene-bis(4-methyl-6,1'-methylcyclohexyl) phenol phosphite, tri(2,2'-bis-(para-hydroxyphenyl)propane)phosphite, tri(4,4'-thio-bis(2-tertiary-butyl-5-methyl-phenol) phosphite, isooctyl-(2,6-bis(2'-hydroxy-3,5-dinonylbenzyl)-4-nonyl phenyl)) phosphite, tetra-tridecyl-4,4'-n-butylidene-bis(2-tertiary-butyl-5-methylphenyl)diphosphite, tetra-isooctyl-4,4'-thio-bis(2-tertiary-butyl-5-methylphenyl) diphosphite, 2,2'-methylene-bis(4-methyl-6,1'methyl cyclohexyl phenyl) polyphosphite, isooctyl-4,4'-isopropylidene-bis-phenyl polyphosphite, 2-ethylhexyl-2,2'-methylene-bis(4-methyl-6,1'-methyl-cyclohexyl) phenyl triphosphite, tetra-tridecyl-4,4'-oxydiphenyl diphosphite, tetra-n-dodecyl-4,4'-n-butylidene bis (2-tertiary-butyl-5-methylphenyl) diphosphite, tetra-tridecyl-4,4'-isopropylidene bisphenyl diphosphite, hexa-tridecyl butane-1,1,3-tris(2'-methyl-5'-tertiary-butylphenyl-4') triphosphite.

Exemplary acid phosphites are di(phenyl) phosphite, monophenyl phosphite, mono(diphenyl)phosphite, dicresyl phosphite, di(o-isooctylphenyl) phosphite, di(p-ethylhexylphenyl) phosphite, di(p-t-octylphenyl) phosphite, di(dimethylphenyl) phosphite, di-n-butyl phosphite, di-2-ethylhexyl phosphite, mono-2-ethylhexylphosphite, diisooctyl phosphite, monoisooctyl phosphite, monododecyl phosphite, 2-ethylhexyl phenyl phosphite, 2-ethylhexyl-(n-octylphenyl)phosphite, monocyclohexyl phosphite, dicyclohexyl phosphite, di(2-cyclohexyl phenyl) phosphite, di-α-naphthyl phosphite, diphenyl phenyl phosphite, di(diphenyl) phosphite, di-(2-phenyl ethyl) phosphite, dibenzyl phosphite, monobenzyl phosphite, n-butyl cresyl phosphite and didodecyl phosphite, cresyl phosphite, t-octylphenyl phosphite, ethylene phosphite, butyl cresyl phosphite, isooctyl monotolyl phosphite and phenyl cyclohexyl phosphite.

Exemplary of the bis aryl acid phosphites are: bis(4,4'-thio-bis(2-tertiary-butyl-5-methylphenol))-phosphite, (4,4'-thio-bis(2-tertiary-butyl-5-methylphenol)) phenyl phosphite, bis(4,4'-n-butylidene-bis(2-tertiary-butyl-5-methylphenol)) phosphite, mono(4,4'-benzylidene-bis(2-tertiary-butyl-5-methylphenol)) phosphite, mono(2,2'-bis-(parahydroxyphenyl) propane) phosphite, mono(4,4'-butylidene-bis(2-tertiary-butyl-5-methylphenol)phosphite, bis(4,4'-thio-bis(2-tertiary-butyl-5-methylphenol)) phosphite, mono-2-ethylhexyl-mono-2,2'-methylene-bis(4-methyl-6,1'-methylcyclohexyl) phenol phosphite, bis (2,2'-bis(para-hydroxyphenyl)propane)phosphite, monoisooctylmono(4,4'-thio-bis(2-tertiary-butyl-5-methylphenol)) phosphite, isooctyl-(2,6-bis(2'-hydroxy-3,5-dinonylbenzyl)-4-nonylphenyl)) phosphite, tri-tridecyl-4,4'-n-butylidene-bis(2-tertiary-butyl-5-methylphenyl) diphosphite, trii-sooctyl-4,4'-thio-bis(2-tertiary-butyl-5-methylphenyl) diphosphite, bis(2,2'-methylene-bis(4-methyl-6,1'-methyl cyclohexyl phenyl)) phosphite, isooctyl-4,4'-isopropylidene-bis-phenyl phosphite, monophenyl mono(2,2'-methylene-bis(4-methyl-6,1'-methylcyclohexyl)) triphosphite, di-tridecyl-4,4'-oxydiphenyl diphosphite, di-n-dodecyl-4,4'-n-butylidene-bis(2-tertiary-butyl-5-methylphenyl) diphosphite, di-tridecyl-4,4'-isopropylidene bisphenyl diphosphite, tetra-tridecyl butane-1,1,3-tris(2'-methyl-5-tertiary-butylphenyl-4)-triphosphite.

The thiodipropionic acid ester has the following formula:

$$R_1OOCCH_2CH_2\text{-}S\text{-}CH_2CH_2COOY$$

in which $R_1$ is an organic radical selected from the group consisting of hydrocarbon radicals such as alkyl, alkenyl, aryl, cycloalkyl and mixed alkyl aryl and mixed alkyl cycloalkyl radicals; hydroxyalkyl and hydroxyalkyloxyalkylene radicals; and esters thereof with aliphatic carboxylic acids; and Y is selected from the group consisting of (a) hydrogen, (b) a second R radical $R_2$, which can be the same as or different from the $R_1$ radical, (c) a polymeric chain of n thiodipropionic acid ester units:

$$\begin{array}{l}-XO[OCCH_2CH_2SCH_2CH_2COOXO]\text{-}\\ {}_nOCCH_2CH_2\text{-}S\text{-}CH_2CH_2COOZ\end{array}$$

where Z is hydrogen, $R_2$ or M, n is the number of thiodipropionic acid ester units in the chain, and X is a bivalent hydrocarbon group of the type of $R_1$, that is, alkylene, alkenylene, cycloalkylene, mixed alkylene-arylene and mixed alkylene-cycloalkylene radicals; hydroxyalkylene and hydroxyalkyloxyalkylene radicals; and esters thereof with aliphatic carboxylic acids; the value of n can range upwards from 0, but there is no upper limit on n except as is governed by the ratio of carbon atoms to sulfur atoms as stated below; and (d) a polyvalent metal M of Group II of the periodic table such as zinc, calcium, cadmium, barium, magnesium and strontium.

The molecular weights of the R and Y radicals are taken such that with the remainder of the molecule the thiodipropionic ester has a total of from about ten to about sixty carbon atoms per sulfur atom.

Accordingly, the various thiodipropionic acid ester species coming within the above-designated categories within the general formula can be defined as follows:

$$R_1OOCCH_2CH_2SCH_2CH_2COOH \quad (a)$$

$$R_1OOCCH_2CH_2SCH_2CH_2COOR_2 \quad (b)$$

R₁O[OCCH₂CH₂SCH₂CH₂COOX—O]-
ₙOCCH₂CH₂SCH₂CH₂COOZ    (c)

R₁OOCCH₂CH₂SCH₂CH₂COOM    (d)

In the above formulae $R_1$ and $R_2$, M, X and Z are the same as before and the value of $n_1$ can range upwards from 1, but there is no upper limit on $n_1$ except as is imposed by the ratio of carbon atoms, as stated below. In the polymer (c), as in the other forms of thiodipropionic acid esters, the total number of carbon atoms per sulfur atom is within the range from about ten to about sixty.

The R radical of these esters is important in furnishing compatibility with the polymer. The Y radical is desirably a different radical, $R_2$ or M or a polymer, where R is rather low in molecular weight, so as to compensate for this in obtaining the optimum compatibility and nonvolatility. Where Y is a metal, the thiodipropionic acid ester furnishes the beneficial properties of the polyvalent metal salt which is described above.

The aryl, alkyl, alkenyl, and cycloalkyl groups may, if desired, contain inert, nonreactive substituents such as halogen and other carbocyclic and heterocyclic ring structures condensed therewith.

Typical R radicals are, for example, methyl, ethyl, propyl, isopropyl, butyl, isobutyl, t-butyl, amyl, isoamyl, n-octyl, isoctyl, 2-ethyl hexyl, t-octyl, decyl, dodecyl, octadecyl, allyl, hexenyl, linoleyl, ricinoleyl, oleyl, phenyl, xylyl, tolyl, ethylphenyl, naphthyl, cyclohexyl, benzyl, cyclopentyl, methylcyclohexyl, ethylcyclohexyl, and naphthenyl, hydroxyethyl, hydroxypropyl, glyceryl, sorbityl, pentaerythrityl, and polyoxyalkylene radicals such as those derived from diethylene glycol, triethylene glycol, polyoxypropylene glycol, polyoxyethylene glycol, and polyoxypropyleneoxyethylene glycol, and esters thereof with any of the organic acids named below in the discussion of the polyvalent metal salts, including in addition those organic acids having from two to five carbon atoms, such as acetic, propionic, butyric and valeric acids.

Typical X radicals are alkylene radicals such as ethylene, tetramethylene, hexamethylene, decamethylene, alkyl-substituted alkylene radicals such as 1,2-propylene,

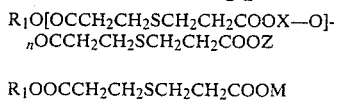

arylene radicals such as phenylene

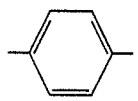

methylenephenylene

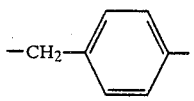

dimethylene phenylene

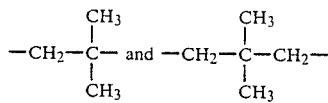

and alicyclylene such as cyclohexylene

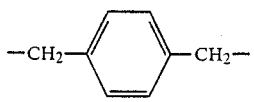

and cyclopentylene

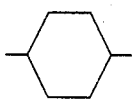

As exemplary of the thiodipropionic acid esters which can be used, there can be mentioned the following: monolauryl thiodipropionic acid, dilauryl thiodipropionate, butyl stearyl thiodipropionate, 2-ethylhexyl lauryl thiodipropionate, di-2-ethylhexyl-thiodipropionate, diisodecyl thiodipropionate, isodecyl phenyl thiodipropionate, benzyl lauryl thiodipropionate, benzyl phenyl thiodipropionate, the diester of mixed cocount fatty alcohols and thiodipropionic acid, the diester of mixed tallow fatty alcohols and thiodipropionic acid, the acid ester of mixed cottonseed oil fatty alcohols and thiodipropionic acid, the acid ester of mixed soyabean oil fatty alcohols and thiodipropionic acid, cyclohexyl nonyl thiodipropionate, monooleyl thiodipropionic acid, hydroxyethyl lauryl thiodipropionate, monoglyceryl thiodipropionic acid, glyceryl monostearate monothiodipropionate, sorbityl isodecyl thiodipropionate, the polyester of diethylene glycol and thiodipropionic acid, the polyester of triethylene glycol and thiodipropionic acid, the polyester of hexamethylene glycol and thiodipropionic acid, the polyester of pentaerythritol and thiodipropionic acid, the polyester of octamethylene glycol and thiodipropionic acid, the polyester of p-dibenzyl alcohol and thiodipropionic acid, ethylbenzyl lauryl thiodipropionate, strontium stearyl thiodipropionate, magnesium oleyl thiodipropionate, calcium dodecylbenzyl thiodipropionate, and mono(dodecylbenzyl) thiodipropionic acid.

These esters are for the most part known compounds, but where they are not available, they are readily prepared by esterification of thiodipropionic acid and the corresponding alcohol.

Also useful are:

(1) Thioalkanoic acid amides of Tokuno et al Japanese Pat. No. 16,286/68 having the formula:

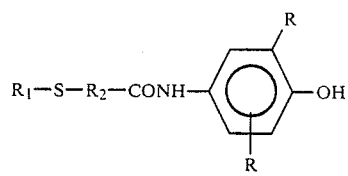

R is alkyl of one to eight carbon atoms, $R_1$ is alkyl of six to twenty-four carbon atoms, and $R_2$ is alkylene of one to six carbon atoms.

(2) Thioalkanoic acid amides of 1,3,5-triazines of Ozeki et al Japanese Pat. No. 20,366/68 having the formula:

$$R-S-C_2H_4-\underset{\underset{O}{\|}}{C}-N\begin{array}{c}\diagup N-\underset{\underset{O}{\|}}{C}-C_2H_4-S-R\\ \diagdown N-\underset{\underset{O}{\|}}{C}-C_2H_4-S-R\end{array}$$

R is alkyl of eight of eighteen carbon atoms. (3) Bis-thioalkanoic acid amides of Yamamoto et al Japanese Pat. No. 23,765/68 having the formula:

$$R-S-C_2H_4-\underset{\underset{O}{\|}}{C}-NH-NH-\underset{\underset{O}{\|}}{C}-C_2H_4-S-R$$

R is alkyl of more than six carbon atoms, aryl or aralkyl.

(4) Bis-thioalkylanoic acid amides of Ozeki et al Japanese Pat. No. 26,184/69 having the formula:

$$R-S-C_2H_4-\underset{\underset{O}{\|}}{C}-NH-NH-\underset{\underset{O}{\|}}{C}-R_1-\underset{\underset{O}{\|}}{C}-NH-NH-\underset{\underset{O}{\|}}{C}-C_2H_4-S-R$$

R is alkyl of twelve to eighteen carbon atoms, and $R_1$ is alkylene of one to ten carbon atoms, cycloalkylene, or arylene.

(5) Bis-alkylene thioalkanoic acid amides of Ozeki Japanese Pat. No. 31,464/69 having the formula:

$$R-S-C_2H_4-\underset{\underset{O}{\|}}{C}-NH-CH_2-NH-\underset{\underset{O}{\|}}{C}-C_2H_4-S-R$$

R is alkyl of more than six carbon atoms, aryl, or aralkyl.

(6) Thioalkanoic acid amide derivatives of Minagawa et al, published Japanese application No. 106,484/74 having the formula:

$$R-S-C_2H_4-\underset{\underset{O}{\|}}{C}-NH-NH-\underset{\underset{O}{\|}}{C}-\underset{\underset{O}{\|}}{C}-NH-NH-\underset{\underset{O}{\|}}{C}-C_2H_4-S-R$$

R is hydrocarbyl of one to twenty carbon atoms.

(7) Alkylene bis-thioalkanoic acid amides of U.S. Pat. No. 4,279,805 to Ohzeki et al, patented July 21, 1981, having the general formula:

$$R_1-S-R_2-\underset{\underset{O}{\|}}{C}-NH-R_3-NH-\underset{\underset{O}{\|}}{C}-R_2-S-R_1$$

wherein:

$R_1$ is alkyl having from one to about fifty carbon atoms;

$R_2$ is alkylene having from one to about three carbon atoms; and $R_3$ is alkylene having from about two to about twelve carbon atoms.

β-Alkylthiopropionic acid esters having the general formula:

$$R-S-C_2H_4COOR-(R')_n$$

wherein:

R is alkyl of four to twenty carbon atoms;

n is a number from 1 to 6; and

R' is the residue of an alcohol having from one to six hydroxyl groups.

Pentaerythritol tetra dodecyl thio propionate is an example of this group.

Other conventional light stabilizers can be employed, such as hydroxybenzophenones such as 2-hydroxy-4-methoxybenzophenone, 2-hydroxy-4-n-octoxy benzophenone, 2,4-dihydroxybenzophenone, benzotriazoles, such as 2(2-hydroxy-5-methylphenyl) benzotriazoles, 2(2-hydroxy-3-t-butyl-5--methylphenyl)-5-chlorobenzotriazole, 2(2-hydroxy-3-5-di-t-butylphenyl) 5-chlorobenzotriazole, 2(2-hydroxy-3,5-di-t-amylphenyl) benzotriazole, benzoates such as phenylsalicylate, 2,4,-di-t-butylphenyl -3,5-di-t-buyl-4-hydroxy phenylbenzoate, nickel compounds such as nickel-2,2'-thiobis(4-t-octyl-phenolate), nickel-monoethyl(3,5-di-t-butyl-4-hydroxybenzyl)phosphonate, substituted acrylonitriles such as methyl-α-cyano-β-methyl-β-(p-methoxy phenyl)acrylate and oxalic anilides such as N-2-ethyl phenyl-N'-2-ethoxy-5-t-butyl phenyl oxalic diamide, N-2-ethyl phenyl-N'-2-ethoxy phenyl oxalic diamide.

A sufficient amount of the stabilizer or combination is used to improve the resistance of the synthetic polymer to deterioration in physical properties when exposed to heat and light, including, for example, discoloration, reduction in melt viscosity and embrittlement. Very small amounts are usually adequate. Amounts within the range from about 0.001 to about 5% total stabilizers including the polymeric light stabilizer of the invention by weight of the polymer are satisfactory. Preferably,, from 0.01 to 3% is employed for optimum stabilization.

Inasmuch as all components are solids, the stabilizer systems of the invention are readily rendered in solid particulate form, comprising a blend of:

(a) polymeric light stabilizer in an amount of from about 10 to 35 parts by weight; and optionally:

(b) a phenolic antioxidant in an amount from about 10 to about 35 parts by weight; and/or (c) other heat or light stabilizers in an amount of from about 10 to about 35 parts by weight.

The polymeric light stabilizer of the invention can be employed in combination with phenolic antioxidant and/or other conventional heat and light stabilizers for the particular synthetic polymer.

Thus, for example, in the case of polyvinyl chloride resins, other polyvinyl chloride resin heat stabilizers can be included, including polyvalent metal fatty acid salts such as barium and cadmium salts of the higher fatty acids; organotin compounds; and epoxy compounds.

With polyolefin resins there can be employed fatty acid salts of polyvalent metals, and the higher fatty acid esters of thiodipropionic acids, such as, for example, dilauryl thiodipropionate.

With polyamide resin compositions, polyamide stabilizers such as copper salts in combination with iodides and/or other phosphorus compounds and salts of divalent manganese can be used.

With synthetic rubbers and acrylonitrile-butadiene-styrene terpolymers, other antioxidants and polyvalent metal salts of the higher fatty acids can be used.

In addition, other conventional additives for synthetic polymers, such as plasticizers, lubricants, emulsifiers, anti-static agents, flame-proofing agents, pigments and fillers, can be employed.

The stabilizer or combination is incorporated in the polymer in suitable mixing equipment, such as a mill or a Banbury mixer. If the polymer has a melt viscosity which is too high for the desired use, the polymer can be worked until its melt viscosity has been reduced to the desired range before addition of the stabilizer. Mixing is continued until the mixture is substantially uniform. The resulting composition is then removed from the mixing equipment and brought to the size and shape desired for marketing or use.

The stabilized polymer can be worked into the desired shape, such as by milling, calendering, extruding or injection molding or fiber-forming. In such operations, it will be found to have a considerably improved resistance to reduction in melt viscosity during the heating, as well as a better resistance to discoloration and embrittlement on ageing and heating.

The following Examples represent preferred embodiments of synthetic resin compositions in accordance with the invention.

EXAMPLES 1 TO 8

Polypropylene compositions were prepared using stabilizers of the invention and three of the prior art, and having the following formulation:

| Ingredient | Parts by Weight |
| --- | --- |
| Polypropylene | 100 |
| Stearyl β-3,5-di-tert-butyl-4-hydroxyphenyl propionate | 0.2 |
| Stabilizer as shown in Table I | 0.3 |

The compositions were thoroughly blended in a Brabender Plastograph, and then compression-molded to form sheets 0.3 mm thick. Pieces 2.5 cm square were cut off from the sheets and exposed to a high voltage mercury lamp, with and without immersion in hot water at 80° C. for 15 hours. The hours to failure were noted, and are shown in Table I.

TABLE I
| Example No. | Stabilizer | Hours to Failure Without Immersion | Hours to Failure After Immersion for 15 Hours |
|---|---|---|---|
| Control 1 | Tetrakis(2,2,6,6-tetramethyl-4-piperidyl) butane-1,2,3,4-tetracarboxylate | 720 | 530 |
| Control 2 | Bis(2,2,6,6-tetramethyl-4-piperidyl) sebacate | 430 | 310 |
| Control 3 | Condensate of 1-(2'-hydroxyethyl)-2,2,6,6-tetramethyl-4-piperidinol with dimethylsuccinate (M.W. = 3000) | 470 | 390 |
| Example 1 | 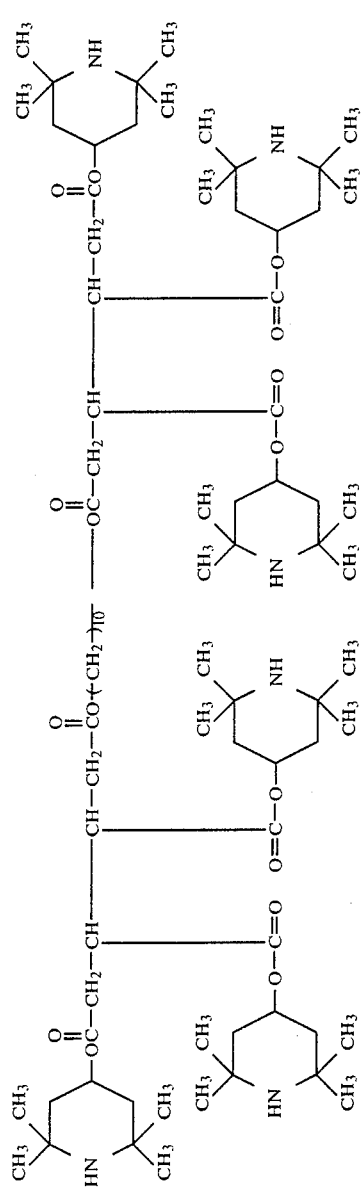 | 810 | 740 |
| Example 2 | 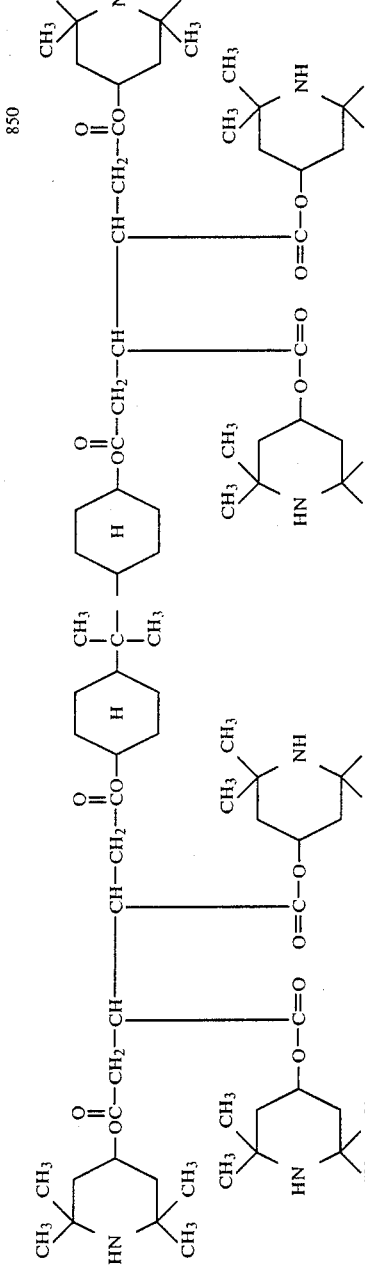 | 850 800 | 800 |
| Example 3 |  | 860 | 820 |

TABLE I-continued

| Example No. | Stabilizer | Hours to Failure | |
|---|---|---|---|
| | | Without Immersion | After Immersion for 15 Hours |
| Example 4 | | 860 | 820 |
| Example 5 | | 830 | 770 |

TABLE I-continued

| Example No. | Stabilizer | Hours to Failure | |
|---|---|---|---|
| | | Without Immersion | After Immersion for 15 Hours |
| Example 6 | (complex chemical structure) | 780 | 720 |
| Example 7 | (complex chemical structure) | 780 | 730 |

TABLE I-continued

| Example No. | Stabilizer | Hours to Failure Without Immersion | Hours to Failure After Immersion for 15 Hours |
|---|---|---|---|
| Example 8 | [chemical structure] | 760 | 700 |

The improvement when using the light stabilizers of the invention as compared to the Controls is evident from the above data.

EXAMPLES 9 TO 16

Conventional stabilizers for polymeric materials may lose their effectiveness because of volatilization or decomposition at high polymer processing temperatures. This is not true of the stabilizers of the invention, as shown by observing the effect of heat in repeated extrusions of ethylene-propylene copolymer compositions. These compositions were prepared using stabilizers of the invention and of the prior art, and having the following formulation:

| Ingredient | Parts by Weight |
|---|---|
| Ethylene-propylene copolymer | 100 |
| Ca stearate | 0.2 |
| Stearyl-β-(3,5-di-t-butyl-4-hydroxyphenyl) propionate | 0.1 |
| Dilauryl thiodipropionate | 0.2 |
| Stabilizer as shown in Table II | 0.2 |

The ingredients were mixed and the compositions then extruded (cylinder temperature 230° C. and 240° C., head die temperature 250° C., velocity 20 rpm) five times. Test pieces after extrusion once and after extrusion five times were molded by injection molding at 250° C. The test pieces were exposed to a high voltage mercury lamp, and the hours to failure noted. The results are shown in Table II.

TABLE II
| Example No. | Stabilizer | Hours to Failure | |
|---|---|---|---|
| | | Extruded Once | Extruded Five Times |
| Control 1 | Tetrakis(2,2,6,6-tetramethyl-4-piperidyl) butane-1,2,3,4-tetracarboxylate | 530 | 310 |
| Control 2 | Bis(2,2,6,6-tetramethyl-4-piperidyl) sebacate | 320 | 180 |
| Control 3 | Condensate of 1-(2′-hydroxyethyl)-2,2,6,6-tetramethyl-4-piperidinol with dimethylsuccinate (M.W. = 3000) | 360 | 240 |
| Example 9 | 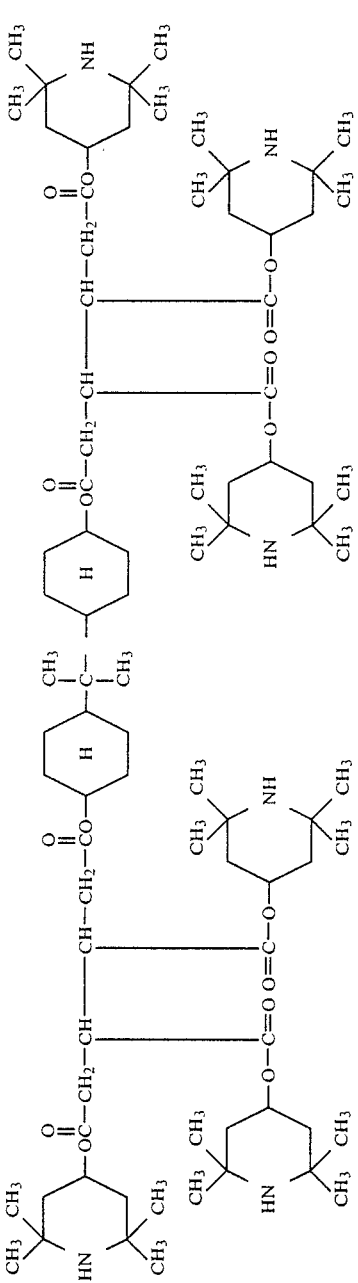 | 610 | 530 |
| Example 10 | 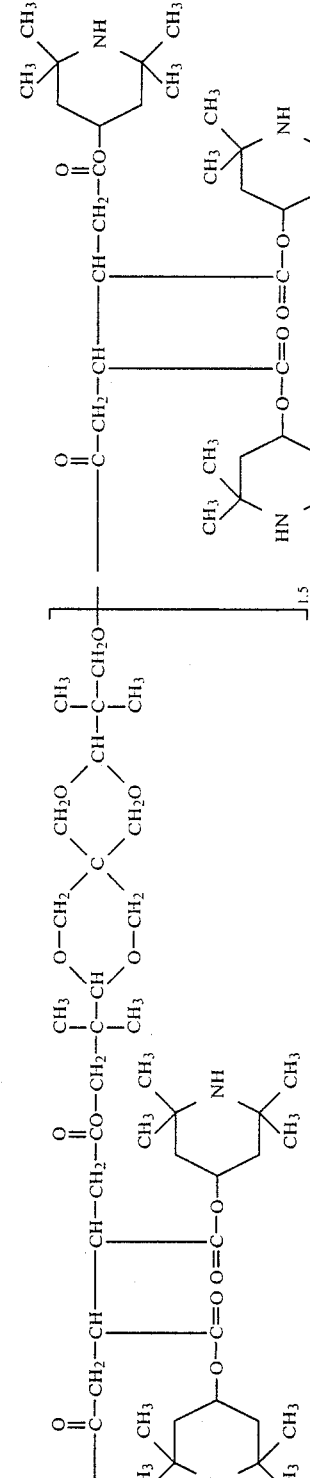 | 600 | 540 |
| Example 11 |  | 550 | 460 |

TABLE II-continued

| Example No. | Stabilizer | Hours to Failure |  |
|---|---|---|---|
| | | Extruded Once | Extruded Five Times |
| Example 12 | (complex chemical structure) | 560 | 470 |
| Example 13 | (complex chemical structure) | 530 | 440 |

TABLE II-continued

| Example No. | Stabilizer | Hours to Failure Extruded Once | Extruded Five Times |
|---|---|---|---|
| Example 14 | | 550 | 460 |
| Example 15 | | 580 | 470 |

TABLE II-continued
| Example No. | Stabilizer | Hours to Failure Extruded Once | Extruded Five Times |
|---|---|---|---|
|  | 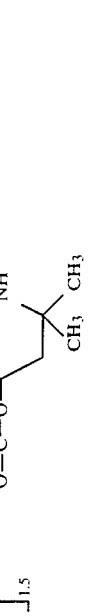 |  |  |
| Example 16 | 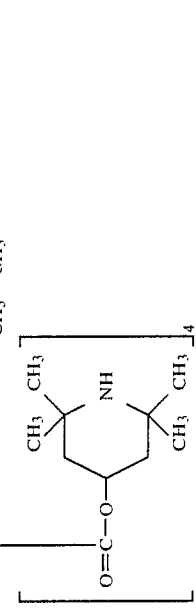 | 560 | 470 |

The improvement when using the light stabilizers of the invention as compared to the Controls is evident from the above data.

EXAMPLES 17 TO 24

High density polyethylene compositions were prepared using stabilizers of the invention and two of the prior art, and having the following formulation:

| Ingredient | Parts by Weight |
| --- | --- |
| High-density polyethylene | 100 |
| Ca stearate | 1 |
| Tetrakis-(methylene-3-(3,5-di-t-butyl-4-hydroxyphenyl) propionate) methane | 0.1 |
| Distearylthiodipropionate | 0.3 |
| Stabilizer as shown in Table III | 0.2 |

The stabilizer was blended with the polymer on a two-roll mill, and sheets 0.5 mm thick were prepared by compression-molding of the blend. Pieces 2.5 cm square were cut off from the sheets, and exposed in a Weather-O-Meter to ultraviolet light. The time in hours when degradation set in, as determined by a significant discoloration and/or embrittlement, was noted as hours to failure, and the results are reported in Table III.

TABLE III

| Example No. | Stabilizer | Hours to Failure |
|---|---|---|
| Control 1 | Tetrakis(2,2,6,6-tetramethyl-4-piperidyl)butane-1,2,3,4-tetracarboxylate | 1060 |
| Control 2 | Bis(2,2,6,6-tetramethyl-4-piperidyl)sebacate | 780 |
| Control 3 | Condensate of 1-(2'-hydroxyethyl)-2,2,6,6-tetramethyl-4-piperidinol with dimethyl-succinate (M.W. = 3000) | 750 |
| Example 17 | [structure] | 1340 |
| Example 18 | [structure] | 1320 |
| Example 19 | [structure] | 1340 |

TABLE III-continued

| Example No. | Stabilizer | Hours to Failure |
|---|---|---|
| Example 20 | (complex chemical structure) | 1350 |
| Example 21 | (complex chemical structure) | 1260 |

TABLE III-continued
| Example No. | Stabilizer | Hours to Failure |
|---|---|---|
| Example 22 | 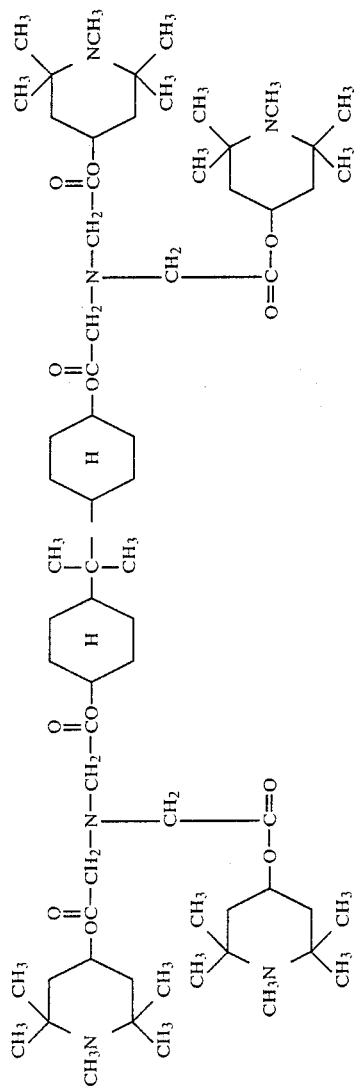 | 1240 |
| Example 23 | 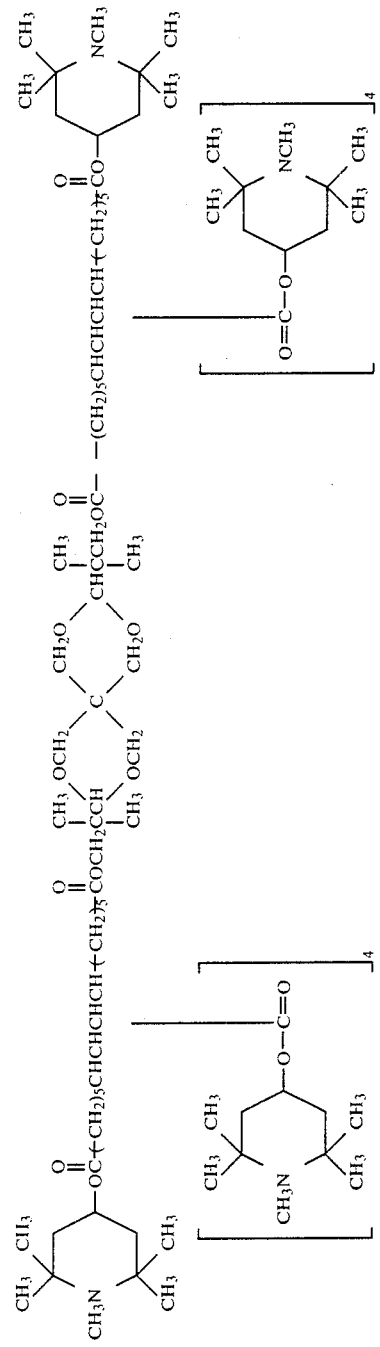 | 1280 |
| Example 24 | | 1220 |

TABLE III-continued

| Example No. | Stabilizer | Hours to Failure |
|---|---|---|

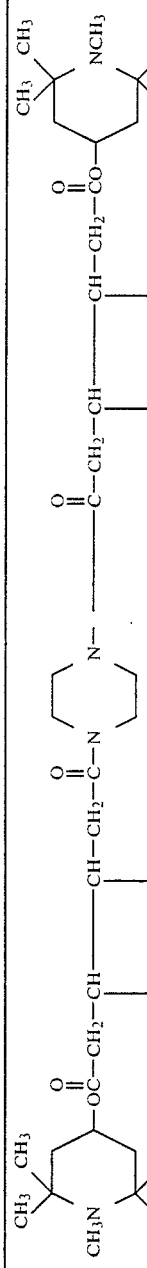

The improvement when using the light stabilizers of the invention as compared to the Controls is evident from the above data.

EXAMPLES 25 TO 32

Ethylene-vinyl acetate copolymer compositions were prepared using stabilizers of the invention and two of the prior art, and having the following formulation:

| Ingredient | Parts by Weight |
|---|---|
| Ethylene-vinyl acetate copolymer | 100 |
| 2,6-di-t-butyl-p-cresol | 0.1 |
| Ca stearate | 0.1 |
| Zn stearate | 0.1 |
| Diisodecylphenyl phosphite | 0.2 |
| Stabilizer as shown in Table IV | 0.2 |

The stabilizer was blended with the polymer on a two-roll mill at 130° C., and sheets 0.4 mm thick were then compression-molded at 140° C. from the resulting blend. Pieces 2.5 cm square were cut off from the sheets, and exposed to ultraviolet light in a Weather-O-Meter for 500 hours. At the start and at the conclusion of the test, tensile strength of the sheet samples was determined. The results are shown in Table IV as precent retention of the initially determined tensile strength:

TABLE IV

| Example No. | Stabilizer | % Retention of Tensile Strength |
|---|---|---|
| Control 1 | Tetrakis(2,2,6,6-tetramethyl-4-piperidyl) butane-1,2,3,4-tetracarboxylate | 68 |
| Control 2 | Bis(2,2,6,6-tetramethyl-4-piperidyl)sebacate | 60 |
| Control 3 | Condensate of 1-(2'-hydroxyethyl)-2,2,6,6-tetramethyl-4-piperidinol with dimethylsuccinate (M.W. = 3000) | 63 |
| Example 25 | [structure] | 81 |
| Example 26 | [structure] | 83 |
| Example 27 | [structure] | 81 |

TABLE IV-continued
| Example No. | Stabilizer | % Retention of Tensile Strength |
|---|---|---|
| Example 28 | 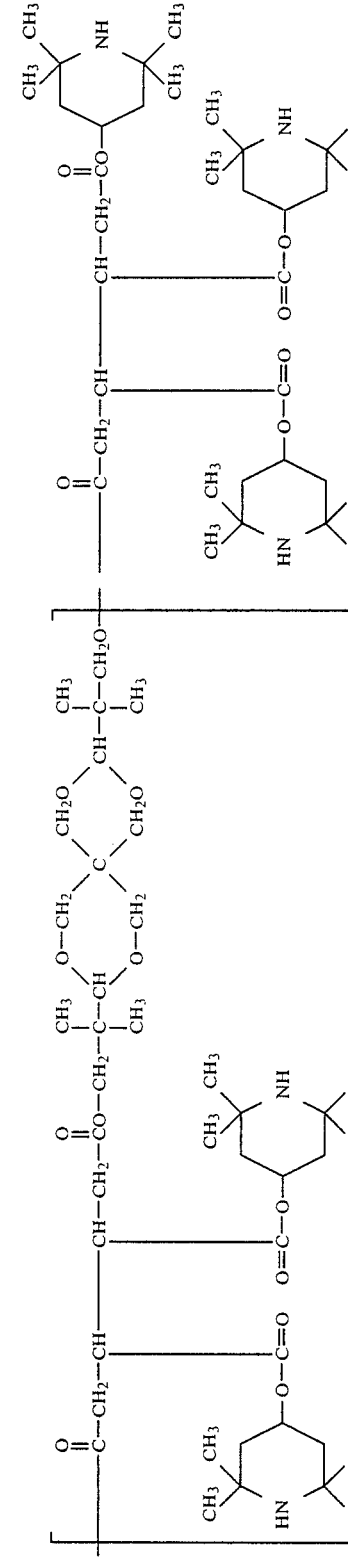 | 87 |
| Example 29 | 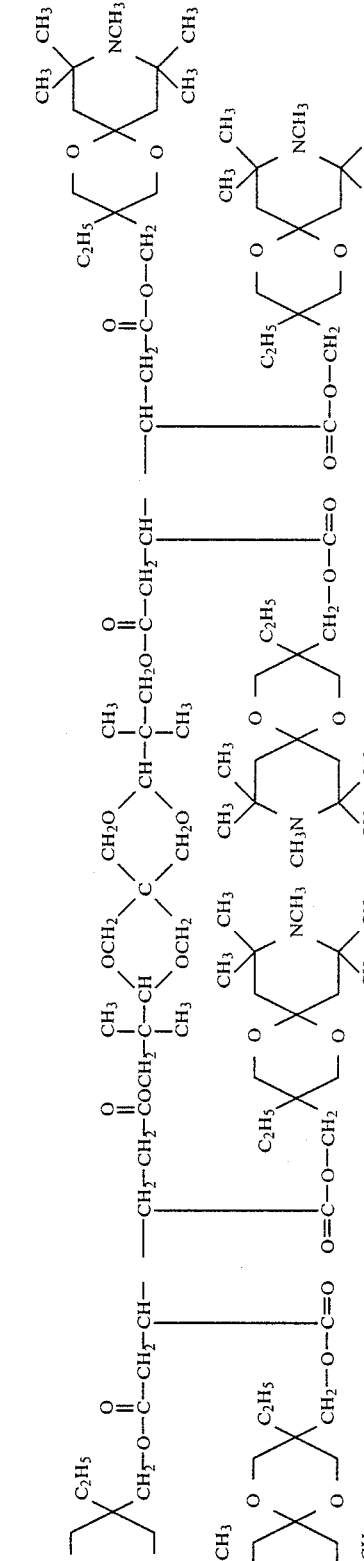 | 80 |

TABLE IV-continued

| Example No. | Stabilizer | % Retention of Tensile Strength |
|---|---|---|
| Example 30 | | 78 |
| Example 31 | | 76 |

The improvement when using the light stabilizers of the invention as compared to the Controls is evident from the above data.

EXAMPLES 33 TO 40

A group of polyvinyl chloride resin compositions was prepared having the following formulation:

| Ingredient | Parts by Weight |
| --- | --- |
| Polyvinyl chloride | 100 |
| Dioctylphthalate | 48 |
| Epoxidized soybean oil | 2 |
| Tris(nonyl phenyl) phosphite | 0.2 |
| Ca stearate | 1.0 |
| Zn stearate | 0.1 |
| Stabilizer as shown in Table V | 0.3 |

This formulation was blended and sheeted off on a two-roll mill to form sheets 1 mm thick. The light resistance of these sheets was then determined by placing strips 1 cm wide in a Weather-O-Meter, and exposing them to ultraviolet light. The time in hours was then noted for the sheets to develop a noticeable discoloration and/or embrittlement, indicating deterioration due to oxidation in the presence of ultraviolet light. The results obtained are shown in Table V:

TABLE V

| Example No. | Stabilizer | Hours to Failure |
| --- | --- | --- |
| Control 1 | None | 200 |
| Control 2 | Tetrakis(2,2,6,6-tetramethyl-4-piperidyl)butane-1,2,3,4-tetracarboxylate | 510 |
| Control 3 | Bis(2,2,6,6-tetramethyl-4-piperidyl)sebacate | 420 |
| Control 4 | Condensate of 1-(2'-hydroxyethyl)-2,2,6,6-tetramethyl-4-piperidinol with dimethylsebacate (M.W. = 3000) | 390 |
| Example 33 | | 710 |
| Example 34 | | 730 |
| Example 35 | | 730 |

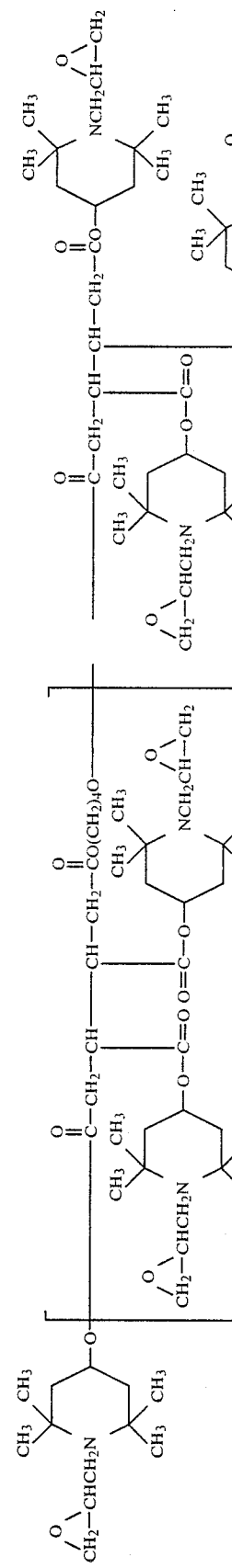

TABLE V-continued
| Example No. | Stabilizer | Hours to Failure |
|---|---|---|
| Example 38 | 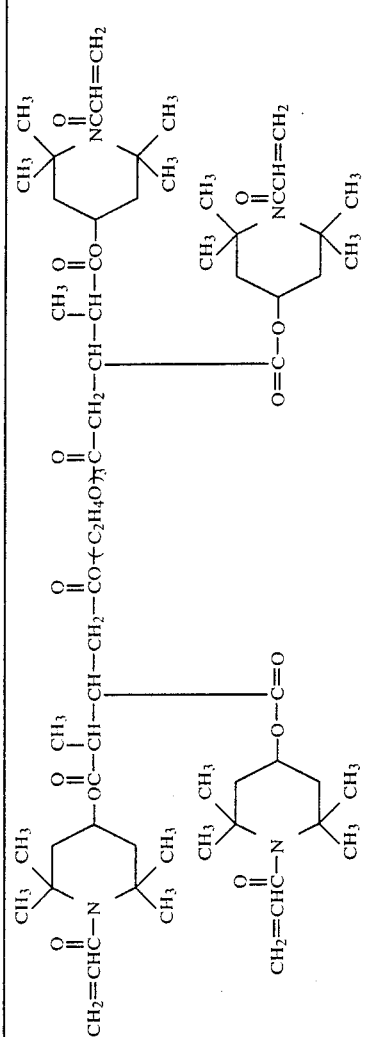 | 650 |
| Example 39 |  | 610 |

The improvement when using the light stabilizers of the invention as compared to the Controls is evident from the above data.

EXAMPLES 41 TO 48

Acrylonitrile-butadiene-styrene terpolymer resin compositions were prepared using stabilizers of the invention and two of the prior art, and having the following formulations:

| Ingredient | Parts by Weight |
| --- | --- |
| Acrylonitrile-butadiene-styrene terpolymer | 100 |
| 4,4'-Butylidene-bis(2-t-butyl-m-cresol) | 0.1 |
| Stabilizer as shown in Table VI | 0.3 |

The stabilizer was blended with the resin on a two-roll mill, and sheets 3 mm thick were prepared by compression-molding of the resulting blend. Pieces 2.5 cm square were cut off from the sheets, and subjected to ultraviolet light in a Weather-O-Meter for 800 hours. Tensile strength before and after the test exposure was determined, and the results reported as the percent of tensile strength retained, at the end of this time, in Table VI.

TABLE VI

| Example No. | Stabilizer | % Retention of Tensile Strength |
|---|---|---|
| Control 1 | Tetrakis(2,2,6,6-tetramethyl-4-piperidyl) butane-1,2,3,4-tetracarboxylate | 73 |
| Control 2 | Bis(2,2,6,6-tetramethyl-4-piperidyl)sebacate | 53 |
| Control 3 | Condensate of 1-(2'-hydroxyethyl)-2,2,6,6-tetramethyl-4-piperidinol with dimethylsuccinate (M.W. = 3000) | 55 |
| Example 41 | [structure] | 81 |
| Example 42 | [structure] | 83 |
| Example 43 | | 84 |

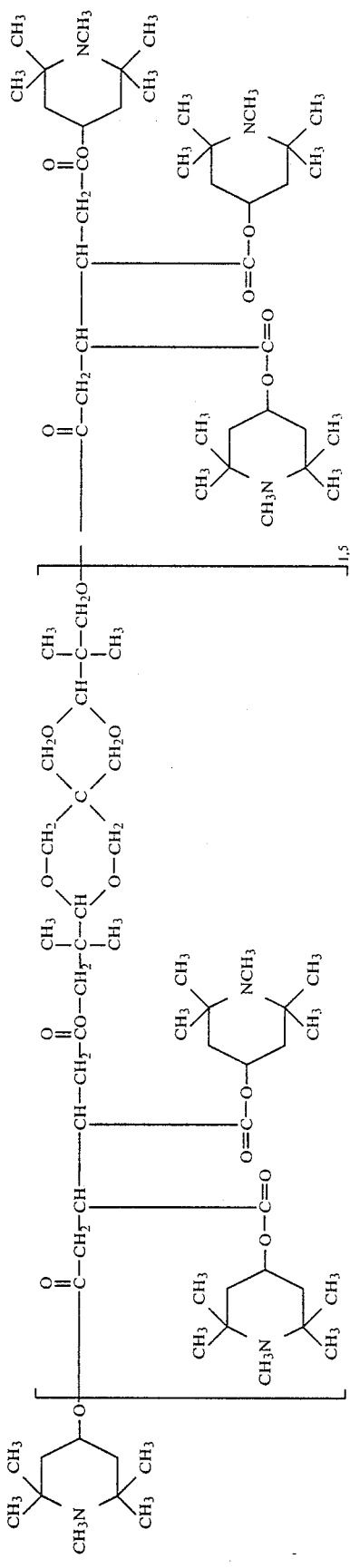

TABLE VI-continued

| Example No. | Stabilizer | % Retention of Tensile Strength |
|---|---|---|
| Example 46 | | 80 |
| Example 47 | | 81 |

TABLE VI-continued
| Example No. | Stabilizer | % Retention of Tensile Strength |
|---|---|---|
| Example 48 | 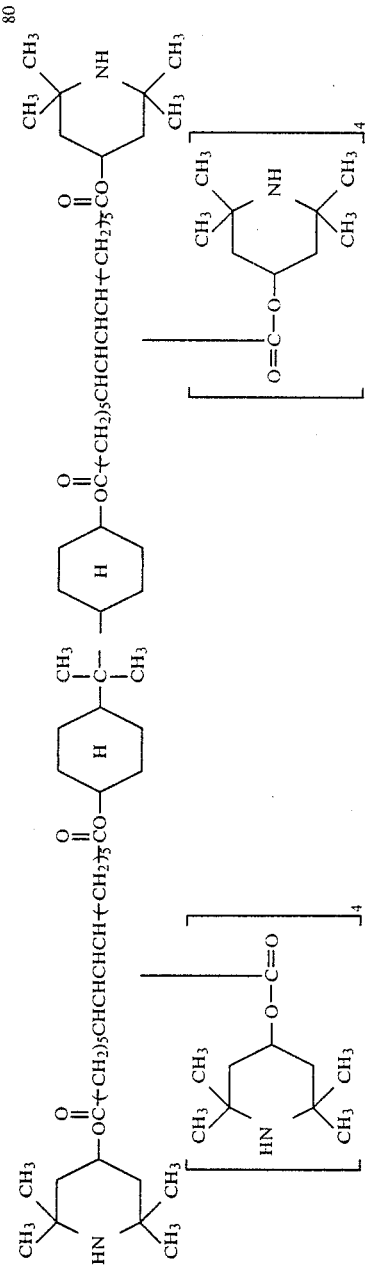 | 80 |

The improvement when using the light stabilizers of the invention as compared to the Controls is evident from the above data.

EXAMPLES 49 TO 56

Polyurethane resin compositions were prepared using stabilizers of the invention and of the prior art and having the following formulation:

| Ingredient | Parts by Weight |
|---|---|
| Polyurethane resin (Asahi Denka U-100)[1] | 100 |
| Ba stearate | 0.7 |
| Zn stearate | 0.3 |
| 2,6-di-t-butyl-p-cresol | 0.1 |
| Stabilizer as shown in Table VII | 0.3 |

[1]A polyurethane-isocyanurate made from toluene diisocyanate and alkylene polyol.

The stabilizer was blended with the finely powdered polyurethane resin on a two-roll mill for five minutes at 70° C., and the sheet was then compression-molded at 120° C. for five minutes to form sheets 0.5 mm thick. Pieces 2.5 cm square were cut out from the sheets, and exposed to ultraviolet light in a Weather-O-Meter for fifty hours. Elongation before and after exposure was determined, and the percent elongation retained after exposure is given in Table VII.

TABLE VII
| Example No. | Stabilizer | % Retention of Elongation |
|---|---|---|
| Control 1 | Tetrakis(2,2,6,6-tetramethyl-4-piperidyl)butane-1,2,3,4-tetracarboxylate | 70 |
| Control 2 | Bis(2,2,6,6-tetramethyl-4-piperidyl)sebacate | 62 |
| Control 3 | Condensate of 1-(2'-hydroxyethyl)-2,2,6,6-tetramethyl-4-piperidinol with dimethylsuccinate (M.W. = 3000) | 56 |
| Example 49 | | 82 |
| Example 50 | | 83 |
| Example 51 | | 83 |
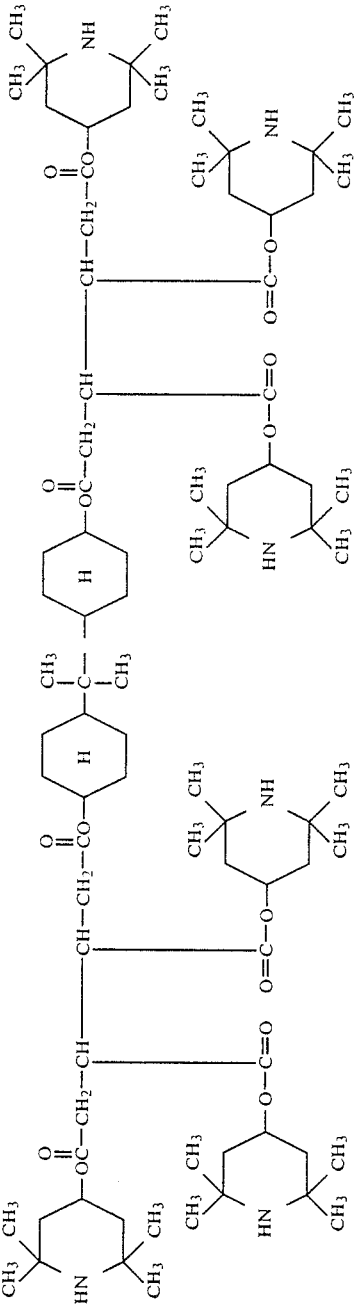

TABLE VII-continued
| Example No. | Stabilizer | % Retention of Elongation |
|---|---|---|
| Example 52 | 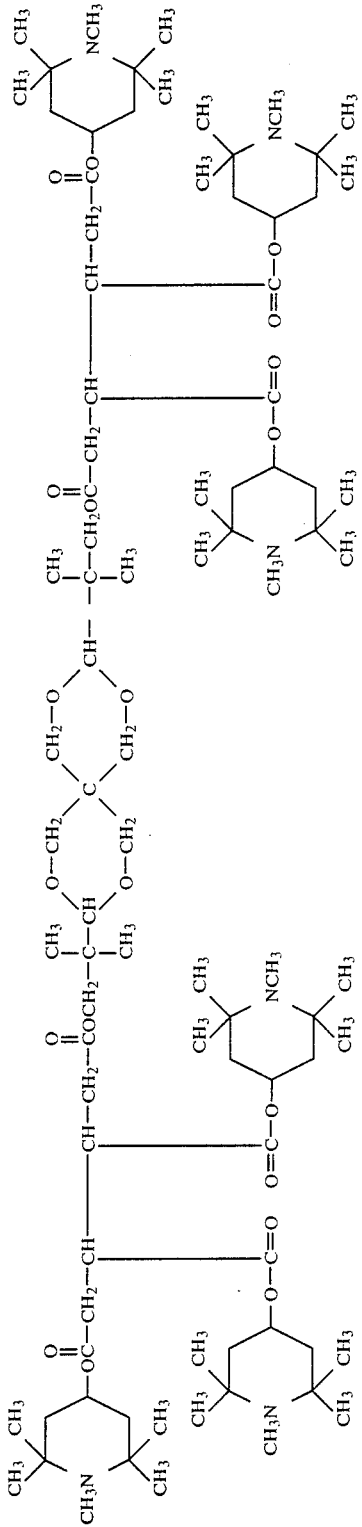 | 80 |
| Example 53 | 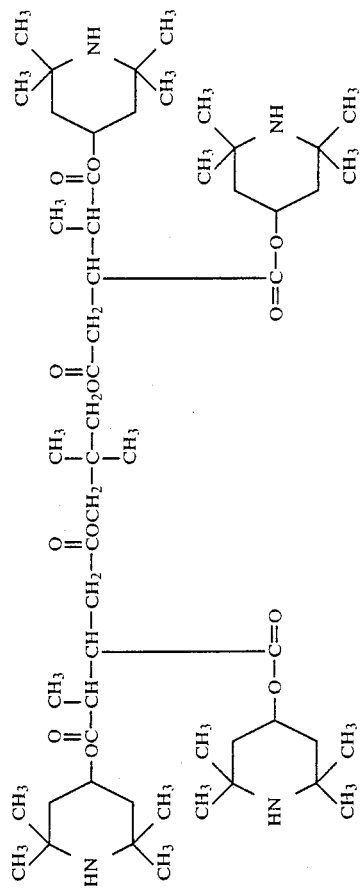 | 80 |

TABLE VII-continued
| Example No. | Stabilizer | % Retention of Elongation |
|---|---|---|
| Example 54 | 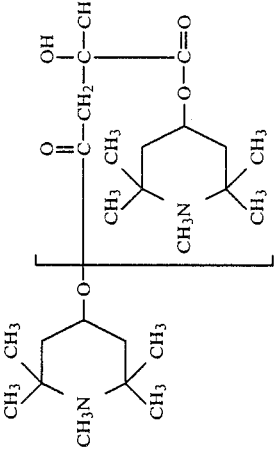 | 81 |
| Example 55 |  | 78 |

TABLE VII-continued

| Example No. | Stabilizer | % Retention of Elongation |
|---|---|---|
| Example 56 | (complex chemical structure) | 77 |

The improvement when using the light stabilizers of the invention as compared to the Controls is evident from the above data.

EXAMPLES 57 TO 65

The stabilizers of this invention are effective as light stabilizers for coatings.

The effect of the stabilizer in a two-coat metallic effect finish comprising metallic effect priming lacquer and unpigmented finishing lacquer was determined.

(A) METALLIC EFFECT PRIMING LACQUER

Methyl methacrylate 100 g, n-butylacrylate 66 g, 2-hydroxyethyl methacrylate 30 g, methacrylic acid 4 g, xylene 80 g and n-butanol 20 g were heated and stirred at 110° C. while a solution of azo-bis(isobutyronitrile) 2 g, dodecylmercaptan 0.5 g, xylene 80 g and n-butanol 20 g was added dropwise over 3 hours. After addition was complete, the solution was stirred for 2 more hours at 110° C., thus preparing an acrylic resin solution.

This acrylic resin solution 12 parts, was blended in with butoxylated methylol melamine (Mitsui-Toatsu Co., Yuban 20SE60; solids content 60%) 2.5 parts, cellulose acetobutyrate (20% butylacetate solution) 50 parts, aluminum pigment (Toyo Aluminum Co., Alpaste 1123N) 5.5 parts, xylene 10 parts, butyl acetate 20 parts and copper phthalocyanine blue 0.2 part. (B) UNPIGMENTED FINISHING LACQUER The above acrylic resin solution 48 parts, was blended with butoxylated methylol melamine 10 parts, xylene 10 parts, butoxyethylacetate 4 parts and stabilizer as shown in Table VIII, 0.15 part.

Pieces of steel sheeting precoated with a primer were first coated with the priming lacquer, and subsequently with the finishing lacquer. The priming lacquer was sprayed on to a thickness of about 20µ, and aired for 10 minutes. Then the clear lacquer was sprayed on, to a thickness of about 30µ. After being aired 15 minutes the samples were heated in an over for 30 minutes at 140° C.

The coated sheets were exposed to ultraviolet light in a Weather-O-Meter. The time in hours when degradation set in, as determined by cracking on the surface of the sheet, was noted as hours to failure, and the results are shown in Table VIII.

TABLE VIII

| Example No. | Stabilizer | Hours to Failure |
|---|---|---|
| Control 1 | Tetrakis(2,2,6,6-tetramethyl-4-piperidyl)butane-1,2,3,4-tetracarboxylate | 2800 |
| Control 2 | Bis(2,2,6,6-tetramethyl-4-piperidyl)sebacate | 2400 |
| Control 3 | Condensate of 1-(2′-hydroxyethyl)-2,2,6,6-tetramethyl-4-piperidinol with dimethylsuccinate (M.W. = 3000) | 2200 |
| Control 4 | None | 1600 |
| Example 57 | (structure) | 3900 |
| Example 58 | (structure) | 3700 |
| Example 59 | (structure) | 4100 |

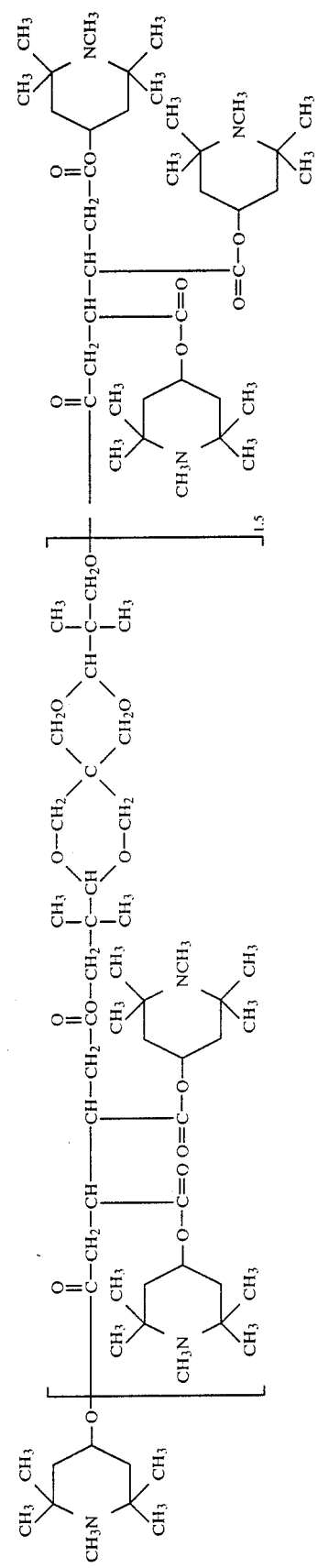

TABLE VIII-continued
| Example No. | Stabilizer | Hours to Failure |
|---|---|---|
| Example 62 | | 3600 |
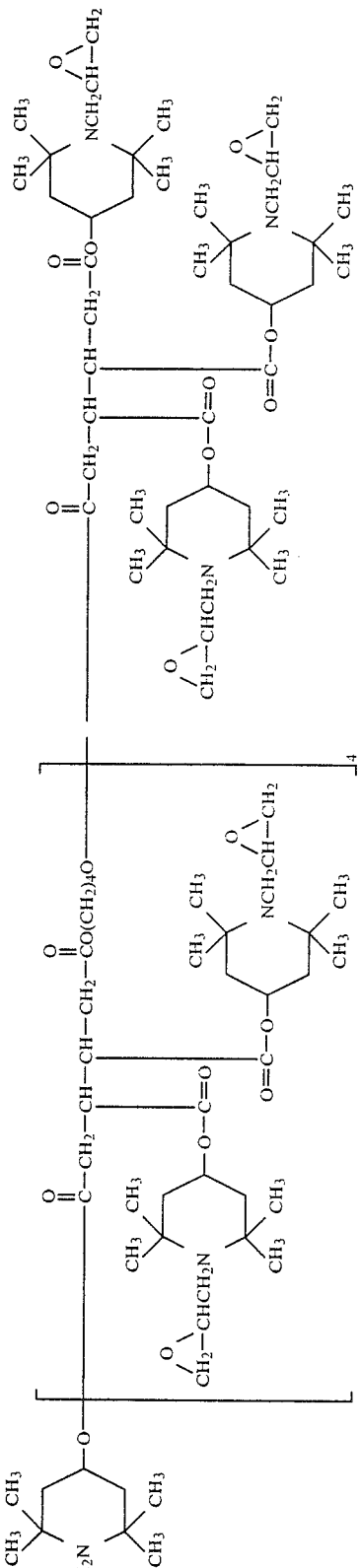

TABLE VIII-continued

| Example No. | Stabilizer | Hours to Failure |
|---|---|---|
| Example 63 | | 3300 |
| Example 64 | | 3400 |
| Example 65 | | 3500 |

TABLE VIII-continued

| Example No. | Stabilizer | Hours to Failure |
|---|---|---|

Stabilizer structures (rotated in original):

Structure 1: A pentaerythritol-based compound with four ester arms, each of the form —OC(=O)—(CH₂)₅CHCHCHCH(CH₂)₇COCH₂— connected to a central C(CH₂O—)₄ core, with terminal 2,2,6,6-tetramethyl-1-methylamino-piperidin-4-yl ester groups (CH₃N substituted piperidine).

Structure 2: [2,2,6,6-tetramethyl-1-methylamino-piperidin-4-yl —O—C(=O)—]₄ tetraester.

The improvement when using the light stabilizers of the invention as compared to the Controls is evident from the above data.

Having regard to the foregoing disclosure the following is claimed as the inventive and patentable embodiments thereof:

1. Oligomers of 2,2,6,6-tetramethylpiperidinol polycarboxylic acid esters having the formula:

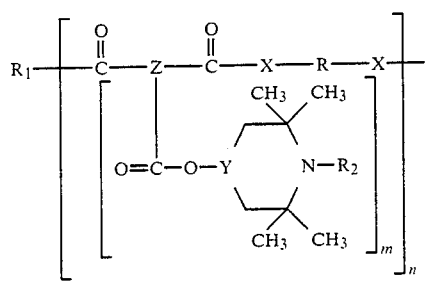

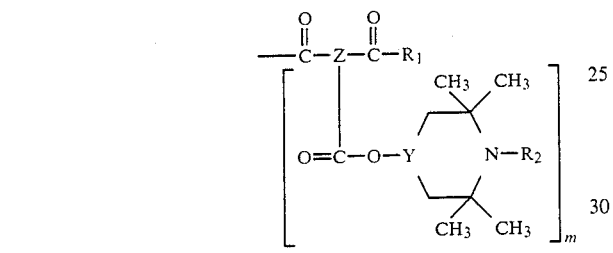

wherein:

Z is the residue of a member selected from the group consisting of aliphatic, aromatic, nitriloaliphatic, and hydroxyaliphatic polycarboxylic acids having from three to six carboxylic acid groups and from one to thirty carbon atoms;

X is —O— or $-\overset{R_3}{\underset{|}{N}}-$, wherein $R_3$ is selected from the group consisting of hydrogen; alkyl and hyroxyalkyl having from one to about twenty carbon atoms; cycloalkyl having from six to about twenty carbon atoms; aryl having from six to about twenty carbon atoms; and cycloalkylene with the N in the ring and having from two to five carbon atoms;

Y is —CH or 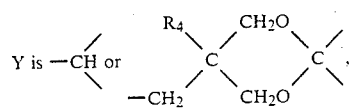

wherein $R_4$ is alkyl having from one to about six carbon atoms;

R is selected from the group consisting of alkylene having from two to about twelve carbon atoms; cycloalkylene having from three to about twelve carbon atoms; phenylene having from six to about twenty carbon atoms; mixed alkylenecycloalkylene, alkylene phenylene and oxyalkylene having from two to about twelve carbon atoms;

$R_1$ is —X—R—X—H or 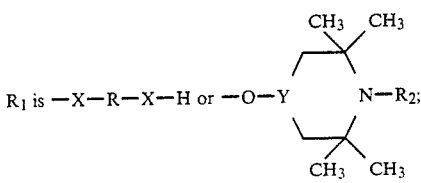

$R_2$ is selected from the group consisting of hydrogen; oxyl; alkyl having from one to about twenty carbon atoms; epoxyalkyl having from two to about six carbon atoms; hydroxyalkyl having from one to about six carbon atoms; acyl having from one to about six carbon atoms; aroyl having from seven to about twenty carbon atoms; and alkaryl having from seven to about twenty carbon atoms;

m is a number from 1 to 4; and n is a number from 1 to 10.

2. Oligomers according to claim 1 in which is alkylene.

3. Oligomers according to claim 1 in which is arylene.

4. Oligomers according to claim 1 in which is nitriloalkylene having three carboxylic acid groups.

5. Oligomers according to claim 1 in which hydroxyalkylene.

6. Oligomers according to claim 1 in which X is —O—.

7. Oligomers according to claim 1 in which X is $-\overset{}{\underset{|}{N}}-R_3.$ 8. Oligomers according to claim 1 in which Y is

9. Oligomers according to claim 1 in which Y is

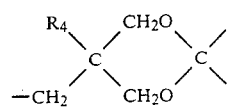

10. Oligomers according to claim 1 in which $R_1$ is —X—R—X—H.

11. Oligomers according to claim 1 in which $R_1$ is

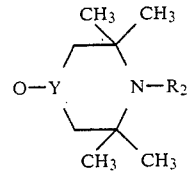

12. Oligomers according to claim 1 in which R is alkylene.

13. Oligomers according to claim 1 in which R is cycloalkylene.

14. Oligomers according to claim 1 in which R is phenylene.

15. Oligomers according to claim 1 in which $R_2$ is hydrogen.

16. Oligomers according to claim 1 in which $R_2$ is alkyl.

17. Oligomers according to claim 1 in which m is 1.

18. Oligomers according to claim 1 in which m is 2.

19. Oligomers according to claim 1 in which m is 3.

20. Oligomers according to claim 1 in which m is 4.

21. Oligomers according to claim 1 in which n is 1.

22. Oligomers according to claim 1 in which n is 2.

23. Oligomers according to claim 1 in which is butylene and m is 2.

24. Oligomers according to claim 1 in which X is —O— and R is

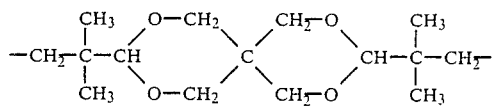

25. Oligomers according to claim 1 having the formula:

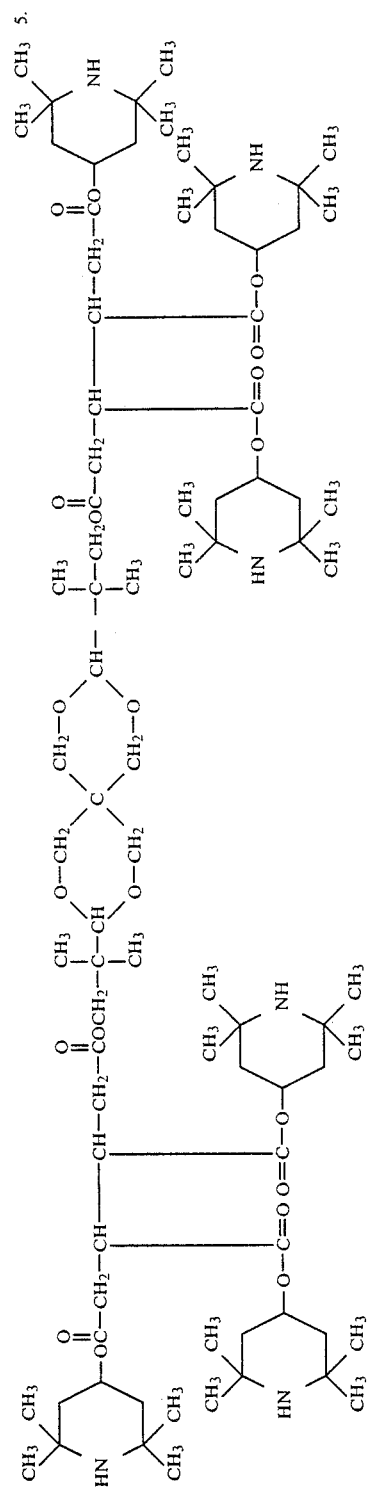

26. Oligomers according to claim 1 having the formula:
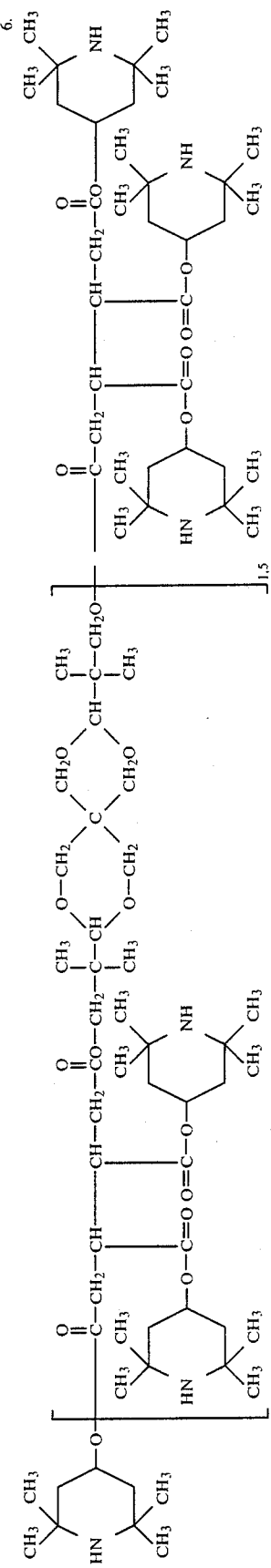
27. Oligomers according to claim 1 having the formula:
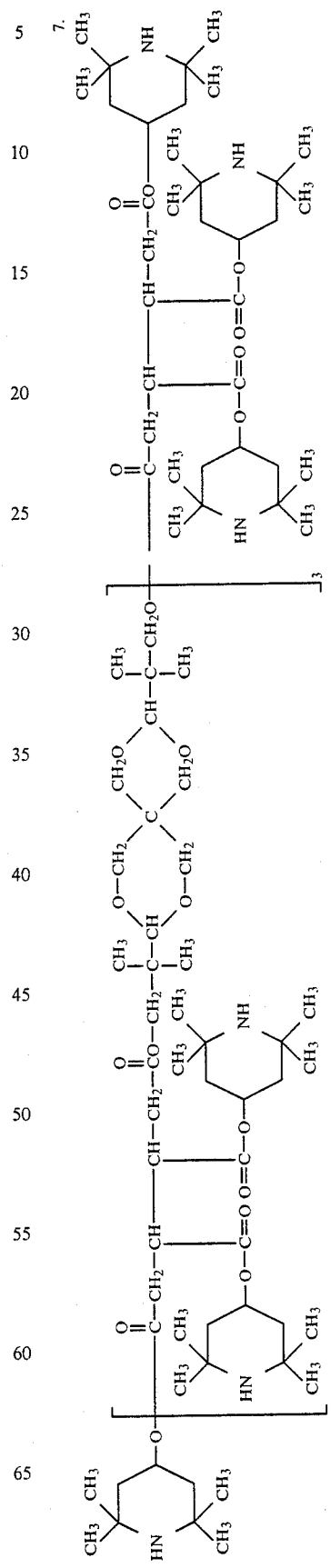

28. Oligomers according to claim 1 having the formula:
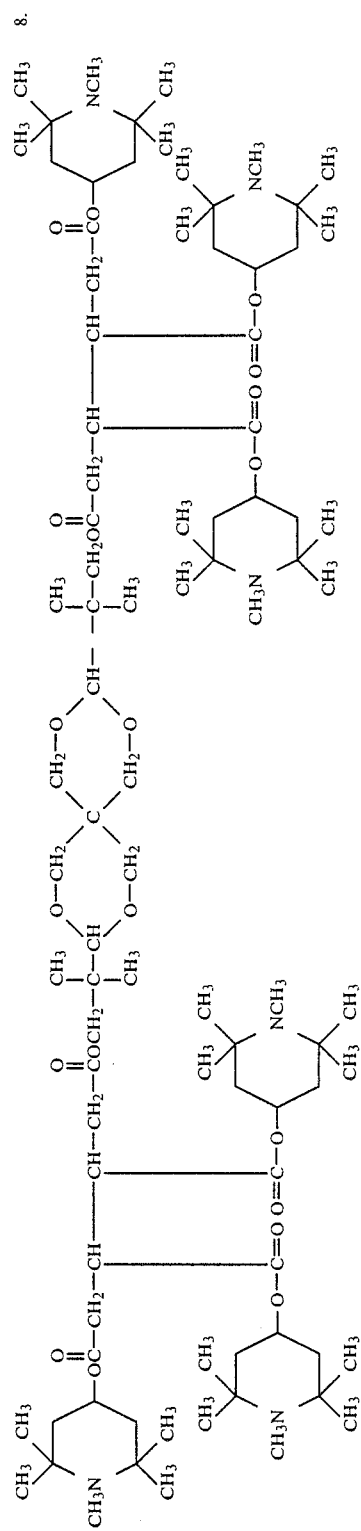
29. Oligomers according to claim 1 having the formula:
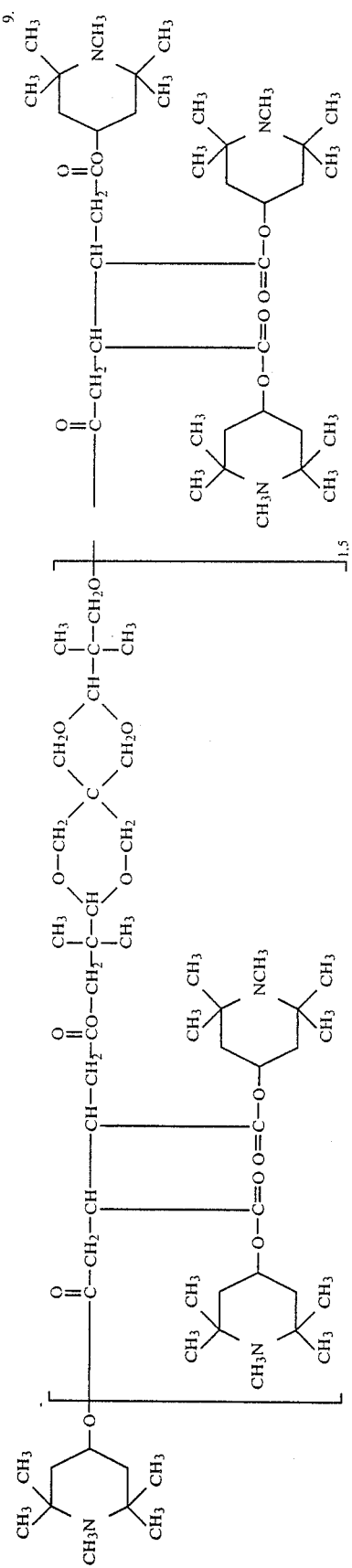

30. A stabilizer composition for synthetic resins comprising:
(1) at least one oligomer in accordance with claim 1 and
(2) at least one phenolic antioxidant having at least one phenolic hydroxyl group, and at least one phenolic nucleus, and from about eight to about three hundred carbon atoms.

31. A stabilizer composition for synthetic resins according to claim 30 in which the phenolic antioxidant is a monocyclic phenol having the structure:

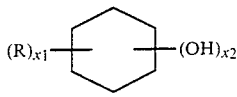

wherein:
R is selected from the group consisting of hydrogen; halogen; and organic radicals containing from one to about thirty carbon atoms selected from the group consisting of alkyl, aryl, alkenyl, alkaryl, aralkyl, cycloalkenyl, cycloalkyl, alkoxy, and $$\text{acyl}(R'C-),$$
$$\|$$
$$O$$

where
R' is aryl, alkyl or cycloalkyl; and
$x_1$ and $x_2$ are integers from one to four, and the sum of $x_1$ and $x_2$ does not exceed six.

32. A stabilizer composition for synthetic resins according to claim 30 in which the phenolic antioxidant is a polycyclic phenol having at least two aromatic nuclei linked by a polyvalent linking radical, as defined by the formula:

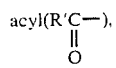

wherein:
Y is a polyvalent linking group selected from the group consisting of oxygen; carbonyl; sulfur; sulfinyl; aromatic, aliphatic and cycloaliphatic hydrocarbon groups; and oxyhydrocarbon; thiohydrocarbon and heterocyclic groups having from one up to twenty carbon atoms;
Ar is a phenolic nucleus selected from the group consisting of phenyl and polycarbocyclic groups having condensed or separate phenyl rings; each Ar group containing at least one free phenolic hydroxyl group up to a total of five; and
$m_1$ and $m_2$ are numbers from one to five, and $n_1$ and $n_2$ are numbers of one or greater.

33. A stabilizer composition for synthetic resins according to claim 30 in which the phenolic antioxidant is a polyhydric polycyclic phenol having the structure:

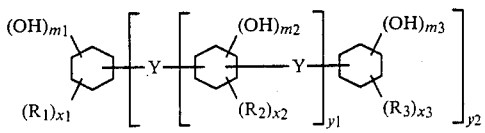

wherein:
$R_1$, $R_2$ and $R_3$ are inert substituent groups selected from the group consisting of hydrogen, halogen and organic radicals having from one to about thirty carbon atoms selected from the group consisting of alkyl, aryl, alkenyl, alkaryl, aralkyl, cycloalkenyl, cycloalkyl, alkoxy, and acyl R'C=O where R' is aryl, alkyl or cycloalkyl;
$m_1$ and $m_3$ are integers from one to a maximum of five;
$m_2$ is an integer from one to a maximum of four;
$x_1$ and $x_3$ are integers from zero to four, and $x_2$ is an integer from zero to three;
$y_1$ is an integer from zero to about six;
$y_2$ is an integer from one to five; and p1 Y is a polyvalent linking group selected from the group consisting of oxygen; carbonyl; sulfur; sulfinyl; aromatic, aliphatic and cycloaliphatic hydrocarbon groups; and oxyhydrocarbon; thiohydrocarbon and heterocyclic groups having from one up to twenty carbon atoms.

34. A polyvinyl chloride resin composition having improved resistance to deterioration comprising a polyvinyl chloride resin and an oligomer in accordance with claim 1.

35. A polyvinyl chloride resin composition in accordance with claim 34 in which the polyvinyl chloride resin is polyvinyl chloride homopolymer.

36. A polyvinyl chloride resin composition in accordance with claim 34 in which the polyvinyl chloride resin is a copolymer of vinyl chloride and vinyl acetate.

37. An olefin polymer composition having improved resistance to deterioration comprising an olefin polymer selected from the group consisting of polymers of alpha-olefins having from two to six carbon atoms and polystyrene, and an oligomer in accordance with claim 1.

38. An olefin polymer composition in accordance with claim 37 wherein the polyolefin is polypropylene.

39. An olefin polymer composition in accordance with claim 37 wherein the polyolefin is polyethylene.

40. An olefin polymer composition in accordance with claim 37 wherein the polyolefin is ethylene-propylene copolymer.

41. A polyester polymer composition having improved resistance to deterioration comprising a polyester and an oligomer in accordance with claim 1.

42. A polyurethane resin composition having improved resistance to deterioration comprising a polyurethane resin and an oligomer in accordance with claim 1.

43. An ethylene-vinyl acetate copolymer composition having improved resistance to deterioration comprising an ethylene-vinyl acetate copolymer and an oligomer in accordance with claim 1.

44. An acrylonitrile-butadiene-styrene polymer having improved resistance to deterioration comprising an acrylonitrile-butadiene-styrene polymer and an oligomer in accordance with claim 1.

* * * * *